June 26, 1962 D. S. HORSLEY 3,041,390

VIDEO SIGNAL CONVERSION METHOD AND APPARATUS

Filed Feb. 29, 1960 5 Sheets-Sheet 1

INVENTOR.
DAVID S. HORSLEY
BY Harry R. Lubcke
AGENT

VIDEO SIGNAL CONVERSION METHOD AND APPARATUS

Filed Feb. 29, 1960 5 Sheets-Sheet 2

INVENTOR.
DAVID S. HORSLEY
BY Harry R. Lubcke
AGENT

VIDEO SIGNAL CONVERSION METHOD AND APPARATUS

Filed Feb. 29, 1960 5 Sheets-Sheet 3

INVENTOR.
DAVID S. HORSLEY
BY Harry R. Lubcke
AGENT

June 26, 1962 D. S. HORSLEY 3,041,390

VIDEO SIGNAL CONVERSION METHOD AND APPARATUS

Filed Feb. 29, 1960 5 Sheets-Sheet 4

INVENTOR.
DAVID S. HORSLEY

BY Harry R. Lubcke

AGENT

INVENTOR.
DAVID S. HORSLEY
BY Harry R. Lubcke
AGENT

United States Patent Office 3,041,390

Patented June 26, 1962

3,041,390

VIDEO SIGNAL CONVERSION METHOD AND APPARATUS

David S. Horsley, 3929 Kentucky Drive, Hollywood, Calif.

Filed Feb. 29, 1960, Ser. No. 11,803
30 Claims. (Cl. 178—5.2)

Figure 1:
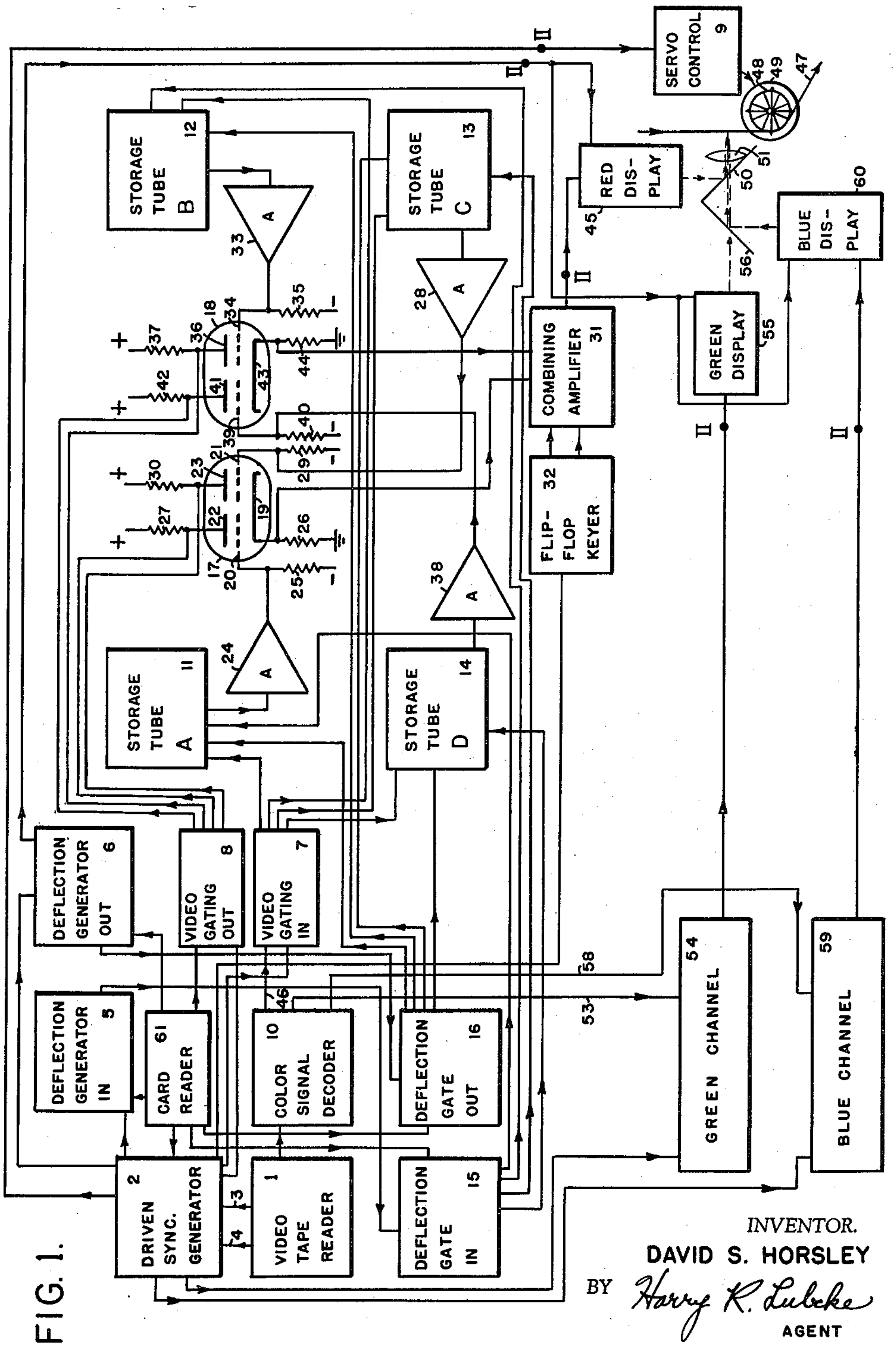

My invention relates to a method and electronic means of relatively universal application for converting visual signals from one format to another and particularly by bridging time incompatibilities between formats by storing video information.

For numerous technical and economic reasons the conversion of visual information from transient images, as in television, to a recorded mode and the conversion of such information from one recording medium to another and from one recorded format to another is highly important.

Briefly explaining my invention, I accomplish this wide range of compatibility between processes essentially incompatible by making available video information as a uniform function of time. Where a blanking period according to one format occurs during an image sequence according to another and desired format, I overcome the situation by immediately priorly recording a sequence of video information sufficiently long in duration to bridge the gap otherwise occurring, and by establishing a read-out sequence from storage that, in effect, makes the information as continuously available as though a field of view were before a television camera, awaiting transmission at any time.

It will be appreciated that the uniqueness of each conversion and the demands of the several different recording media might be thought to present a problem of such proportions as to be solvable for only each specific case. However, I have found a method and means by which essentially all conversion may be accomplished according to essentially a single method and without appreciable redundancy in apparatus.

My method is carried out by an equipment having four groups of apparatus. Firstly, originating or reproducing means for transforming picture information to a video signal is required, and lastly, recording means to accomplish either the initial or re-recorded recording of the visual information is also required. I bridge the gap between these terminal aspects of the processing by providing a plurality of separate storage means and control means for the same. For some conversions I have found that duplicate storage of information is required, while for other conversions single storage is sufficient. In any event, the information is grouped; according to scanning format as one convenient means of grouping. My control means determines how the storage routine shall occur and how read-out from the same shall take place. The storage means and the control means constitute the other two of the four groups of apparatus mentioned.

Although a certain complex of apparatus is required in each case I have found it is possible to employ many entities thereof in each conversion regardless of the formats involved. Also, it is possible to program the operation of the apparatus complex for each conversion by computer-like means. A card reader with an appropriately punched card or cards for each particular conversion is suitable.

It is entirely feasible to convert color pictorial information according to my method and so the apparatus described is capable of handling color. For monochrome only one of the three channels provided is utilized and for unusual color methods employing only two information indexes only two channels need be utilized.

Conversions of video information from live television performances and video taped television performances to motion picture film, taped television performances to taped television performances according to different scanning standards, and film program sources to tape recordings may all be handled according to my method with my equipment.

An object of my invention is to convert visual information from one format to another.

Another object is to provide, in effect, continuous availability of visual information from a visual record wherein such information is not really continuously available.

Another object is to convert visual information originally recorded on video tape to a recording on motion picture film according to standards of dimensions and texture existing for such film.

Another object is to convert video information originally recorded according to one scanning format on video tape to a recording on video tape according to another scanning format.

Another object is to convert visual images recorded upon a film to video signals recorded upon video tape.

Another object is to convert video information originally recorded upon video tape having one recording medium to video tape having a different recording medium.

Another object is to accomplish video format conversion by means of multiple electrical storage means.

Another object is to provide essentially automatic means for performing various format conversions of visual information.

Another object is to provide an essentially universal format conversion equipment composed of units of apparatus.

Other objects will become apparent upon reading the following detailed specification and upon examining the accompanying drawings, in which are set forth by way of illustration and example certain embodiments of my invention.

Figure 2:
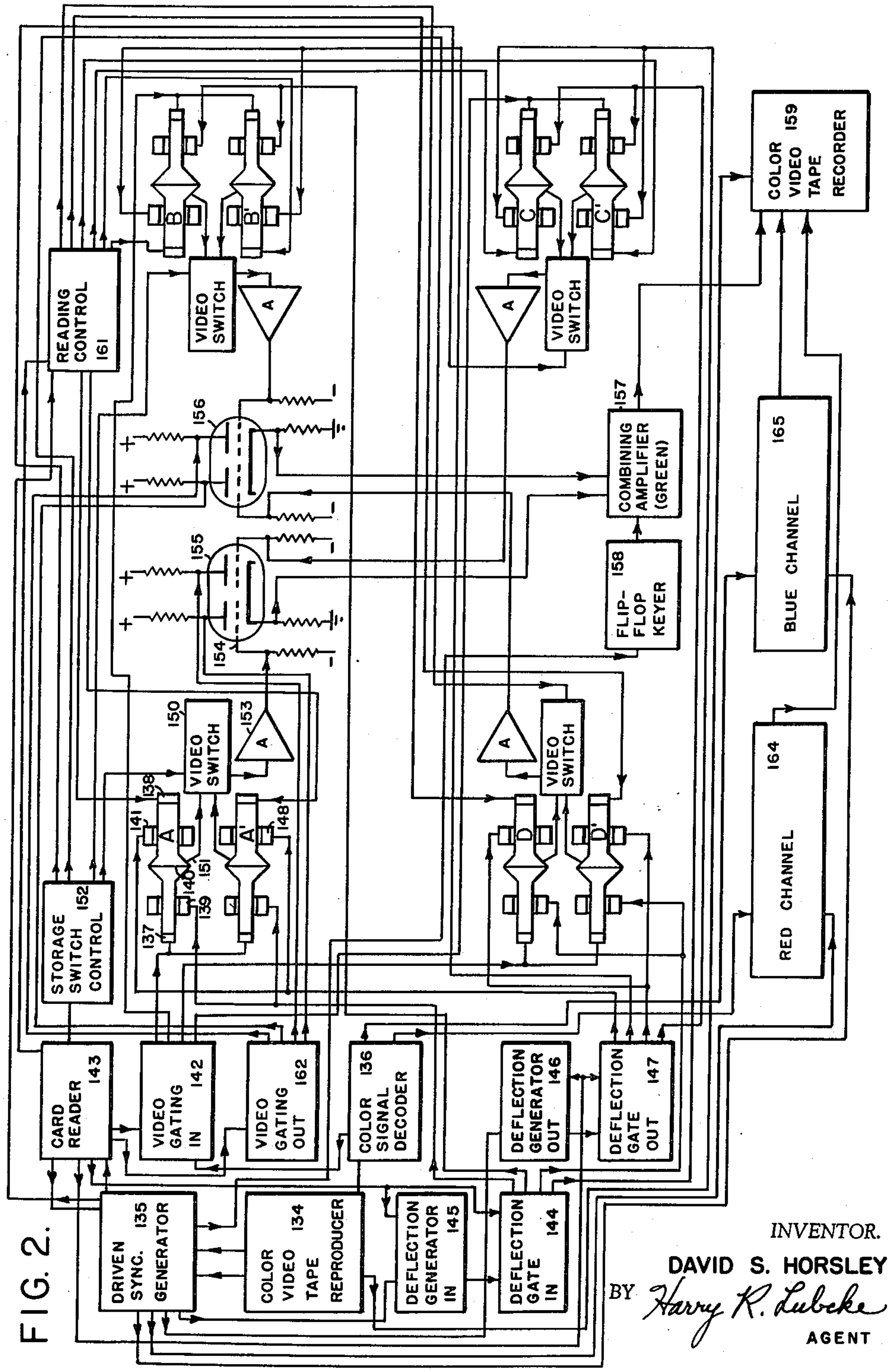
Figure 3:
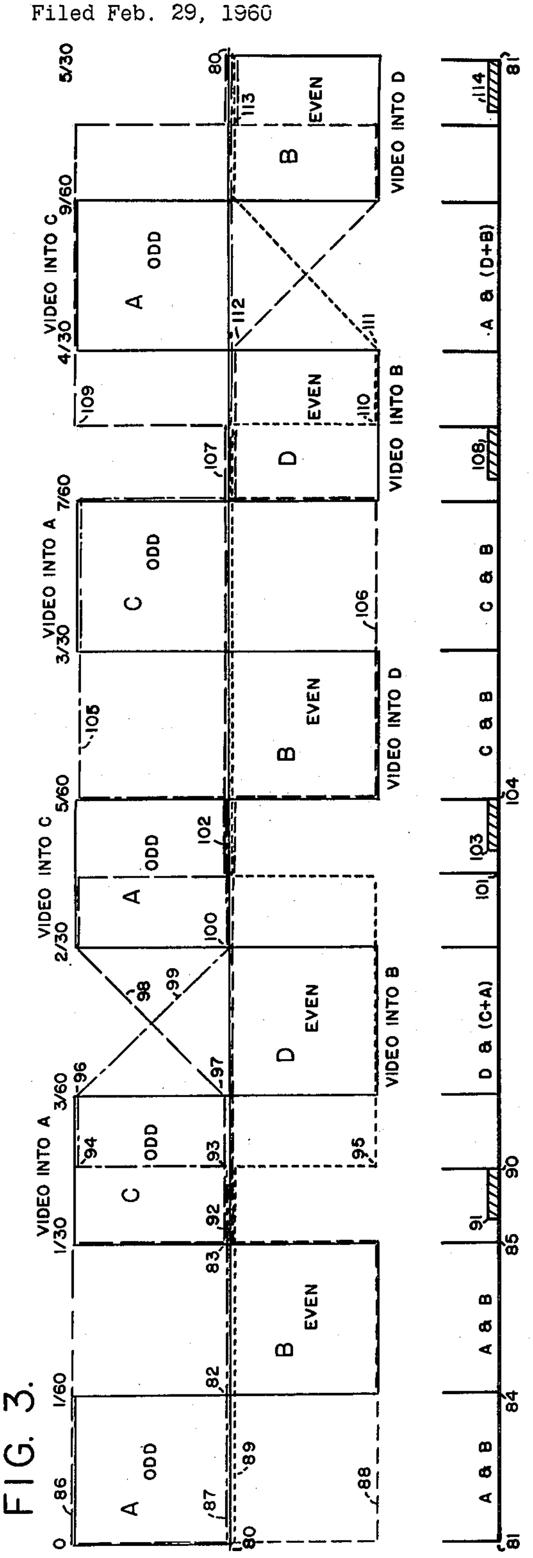
Figure 4:
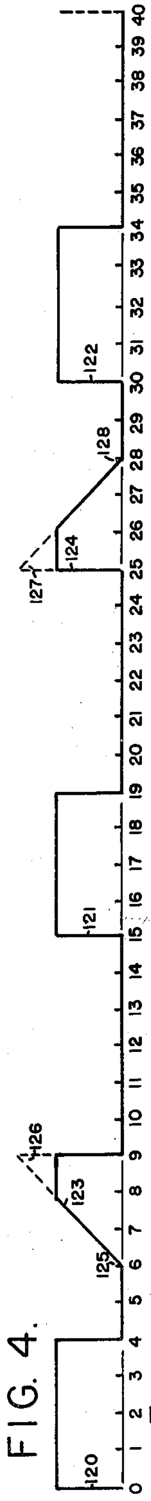
Figures 5, 6:
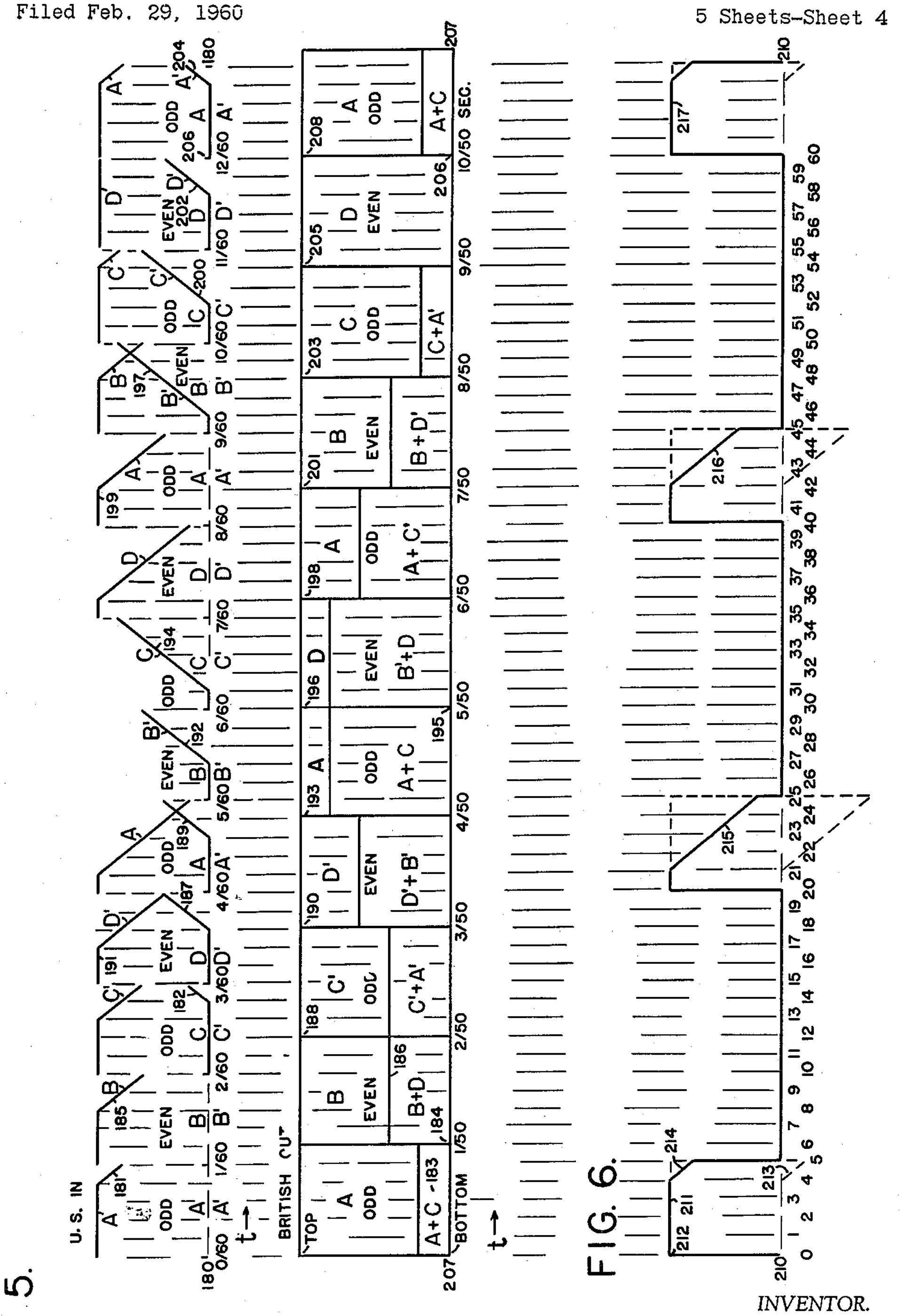
Figure 7:
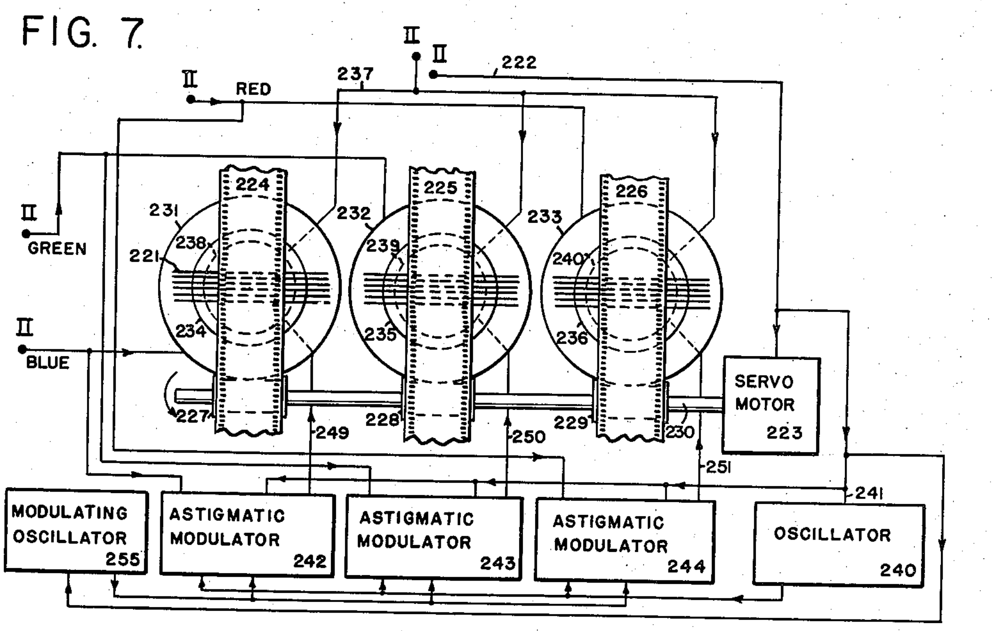
Figure 8:
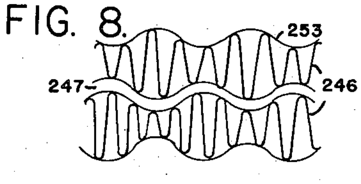
Figure 9:
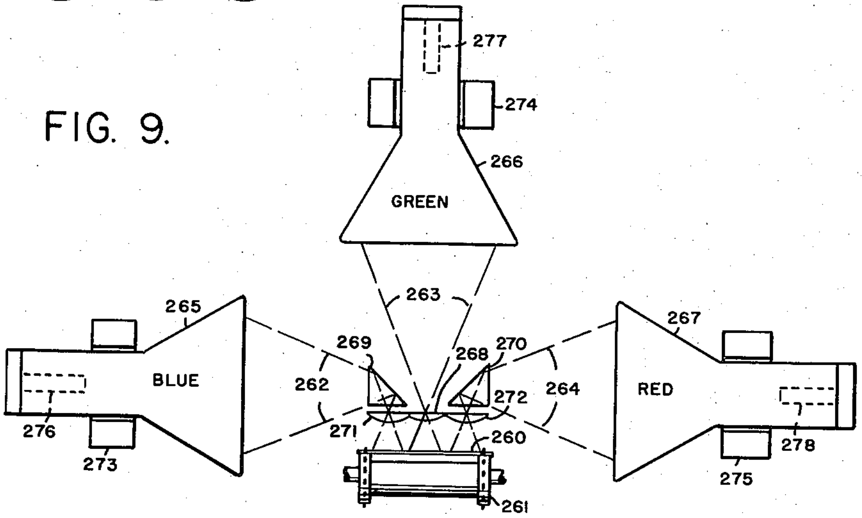

FIG. 1 shows an embodiment of my invention in which by successive storage video tape information is converted to visual information on film, FIG. 2 shows an embodiment of my invention in which by duplicate successive video tape information is converted to video tape information of a different format, FIG. 3 shows a diagrammatic representation of the method of operation of the apparatus of FIG. 1 and of electrical waveforms involved therein, FIG. 4 shows a particular waveform of FIG. 3, as concerned with the electrical formation of that waveform, FIG. 5 shows a diagrammatic representation of the method of operation of the apparatus of FIG. 2 and of electrical waveforms involved therein, FIG. 6 shows a particular waveform of FIG. 5, as concerned with the electrical formation of that waveform, FIG. 7 shows a front elevation of means for recording visual information from my conversion apparatus upon motion picture film, FIG. 8 shows an enlarged view of a typical recording trace produced according to the apparatus of FIG. 7, and FIG. 9 shows a plan view of further alternate means for recording visual information from my conversion apparatus upon motion picture film of a different type than that of FIG. 7.

In FIG. 1 numeral 1 indicates a video tape reader, such as reproduces video images from 2" wide oxide-coated magnetic tape by rapid transverse scanning thereof. This may be a known device such as manufactured by Ampex, or the RCA type TRT–1A. Other tape readers may also be employed as stated later.

Various synchronizing outputs are derived from tape reader 1 by driven sync. generator 2. One input, at 3, is the 240 cycle tone that was recorded on the control track of the video tape during the recording process. This is employed in tape reader 1 to control the proper functioning thereof and I further employ it for servo loop control 9 of the transport of my tri-color film printer.

Another output at 4, is the video synchronization and is composed of line and field pulses, as known. This synchronization I remove ("strip") from the combined video and synchronizing signal, in which form it is present upon the tape, by means of a synchronizing separator circuit contained in driven sync. generator 2. The resulting synchronizing signal is supplied in suitable form for synchronizing deflection generator "in" entity 5 and also for synchronizing deflection generator "out" entity 6. A suitably sequenced synchronizing signal is also applied to video gating "in" entity 7 and another to video gating "out" entity 8.

A typical color television video signal per se is characterized by a sub-carrier multiplexed structure; that is, a wide-band luminance signal having two chrominance-modulated sidebands on a sub-carrier of high video frequency, as 3.58 megacycles for the United States color television standards currently in use.

For purposes of illustration and example such a color signal is assumed to be recorded on the video tape within tape reader 1. It is necessary to decode this signal in color signal decoder 10. This decoder is of the type also found in color television receivers. It provides three amplitude modulated signals, each carrying luminance information of one primary color.

An important group of elements in the apparatus of FIG. 1 is the four storage-tube complex composed of tubes 11, 12, 13, 14. These are required to write video information in a desired sequence, store the same for a fraction of a second and then to read out the same information in a different order. A "write-in" "read-out" type of storage tube is required. These are known, and the Pensak Graphecon, the RCA C73972 and the RCA 7539 are examples.

The basic operation here required is the storage of the line interlaced format of television so that sequential scanning can be read out of storage to most effectively record on a uniformly moving strip of motion picture film.

In addition to this requirement I have found an "up-dating" opportunity with respect to the process which tends to overcome a long-time defect of motion picture rendition of motion. The "strobe" effect of the spokes of wagon wheels has been a long-known shortcoming in motion picture technique. This arose because of the limited time of film exposure in the camera for each frame and because of the relatively slow exposure rate of 24 frames per second. With the constant exposure of the television camera tube to the scene being transmitted and the 60 field repetition rate of half of the lines of the field of view as a whole according to two-to-one interlaced scanning the strobe effect is largely absent.

By a judicious combination of the video information, television procured initially, upon the several storage tubes the strobe effect can be mitigated even though the film thus printed is exhibited at 24 frames per second. This, of course, is an important advance.

It will be noted from FIG. 1 that each of storage tubes 11–14 receives video information from decoder 10 through video gating "in" entity 7 via the conductors shown. This is of the luminance characteristic of only one color component, as will become apparent later.

Similarly, each of the storage tubes is provided with scanning deflection for writing-in the video information, from deflection generator "in" 5, through deflection gate "in" 15, via other conductors shown.

The application of these signals to the writing portion of each storage tube results in images, or parts of images, to be stored upon the storage surfaces thereof. The exact sequencing of this storage will be later disclosed. Suffice it to say that, in effect, there is a continuous image written upon the storage tubes as a whole and this image is read-out and unto the film in an understandably simple manner. The "up-dating" mentioned is accomplished by a gradual transition from information supplied from one field to that from another.

Deflection generator "out" 6 is operated in proper synchronism with the transport of the video tape in reader 1, although this is an integrated type of synchronism rather than line by line or frame by frame. Deflection gate "out" 16 determines the sequence by which the stored video information will be read out of the respective storage tubes 11–14 and is connected to each by the conductors shown. It is necessary that the stored information be read out when needed but not before, since the storage tubes are operated on the one-readout-erase mode. Accordingly, electrical energy from entity 16 either permits scanning of the readout electron beam and removes an extinguishing bias upon the electron gun to provide such a beam, or it merely removes the extinguishing bias when the particular storage surface is to be read out. A stationary electron beam cannot be allowed to impinge upon the mosaic, as is well known in the art. The necessary sequencing is controlled by the action of the card reader 61 upon out gate 16 and also upon video gating "out" 8, as further detailed in connection with FIGS. 2 and 3.

The proper assembly of the outgoing video information is accomplished in a pair of "commutating" vacuum tubes, as the pair of double triodes 17, 18 of FIG. 1. Triode 17 has a common cathode 19, two symmetrical control grids 20, 21 and two symmetrical plates 22, 23. Storage tube A, (11), has amplifier 24 connected to its reading gun to raise the level of the stored video signal to several volts so as to suitably swing grid 20 connected thereto. The grid works over the major portion of the linear characteristic of this section of twin-triode 17. Resistor 25, also connected to the grid 20, is the known grid return resistor. It returns to a negative bias source, identified in FIG. 1 by a minus sign ("-") for simplicity. This source is adjusted in magnitude of negative voltage to position the signal voltage on the grid on the part of the characteristic desired. While this may be the linear portion it also may be the non-linear portion if a correction of gamma of the video information is to be effected. An adjustable negative bias supply may be servoed to gamma sensing means for automatic correction, if desired.

Plate 22 of triode 17 is connected to video gating out 8, which in turn is connected to driven sync. generator 2. This results in an appropriate rectangular waveform being impressed upon plate 22 to pass the video signal from storage tube A upon proper schedule. The video signal output from twin-triode 17 is taken as a voltage across common cathode resistor 26. As far as triode section 20, 22 is concerned it will be seen that the plate-cathode current flowing through resistor 26 will depend upon the plate potential upon plate 22 for a given video signal level and bias condition. Resistor 27 is connected to plate 22 and allows the commutating signal from "out" gate 8 to be developed as a potential at plate 22. The opposite end of resistor 27 is connected to a known source of plate supply voltage, which voltage may be adjustable to balance video amplitudes in the system. This source is identified in FIG. 1 by a plus sign. The voltage of the source is small and the triode section described is biased off to non-conduction insofar as this plate voltage is concerned.

In the same manner, storage tube C, (13), is connected through amplifier 28 to grid 21 of the triode pair within envelope 17. Grid return resistor 29 corresponds to its prior counterpart 25 and a negative bias is provided as before. Whether or not these circuits are "D.C coupled," as may be inferred from FIG. 1, is a matter of choice. A coupling capacitor may be included at the output of amplifiers 24, 28, etc., and similarly in video gating out 8. Normally, the video and gating processes are at sufficiently high rates to allow A.C. coupling by means of capacitors. For unusual applications D.C. coupling may be provided as a matter of design.

In a similar manner an appropriately timed positive pulse is provided independent of other pulses from video gating out 8 to plate 23 of twin triode 17 over resistor 30, which latter also connects to a source of plate supply indicated by the plus symbol.

It is seen that vacuum tube 17 comprises either an alternate or a combining gate-like element for controlling outputs from storage tubes A and C. The plate-cathode current flowing through resistor 26 constitutes the output signal. This is from the left-hand triode if the right-hand triode is cut-off and vice versa. If both triodes are partially conducting there will be a combination of the outputs. By properly shaping the waveforms there will be any desired degree of combination of video waveforms from storage tubes A and C is obtained as a varying voltage across cathode resistor 26. The waveforms shaped, of course, are those appearing as positive values at plates 22 and 23.

I employ this capability in processing to appropriately switch successive frames from the storage tube groups to the display means for writing the visual information upon film and to alter particular fields of video information to be as timely as possible. That is, transitions from one video field to the next are made more or less as soon as these are available to the readout part of the system rather than to hold these useless for approximately a frame interval and then employ them. The latter mode of operation results in jerky or "strobe" motion, whereas the mode I employ reduces this effect, as has been previously mentioned.

Specifically, I prefer to increase the intensity of visual information read out of storage on transitional fields of processing in a gradual manner; as for example, to initiate a given transition with full amplitude of intensity of visual information from an occurring field which then reduces to zero intensity for that field while the intensity of visual information from a field initially impending (i.e., about to be available) starts at zero and concludes at full intensity at the end of the field interval in question. This is accomplished by the use of trapezoidal waveforms for gating on plates 22 and 23 of twin triode 17, which will be treated further in connection with FIG. 3.

Continuing the description of the apparatus, the appropriately combined visual information from cathode resistor 26 passes to a combining amplifier 31. This amplifier does not disturb any combination already effected but switches between twin triodes 17 and 18, thus from storage tube pairs A, C to B, D. The gating-in and gating-out action is accomplished by gating signals from flip-flop keyer 32. This keyer is synchronized from driven sync. generator 2 such as to be consonant with the read-out or film format.

As is now evident, a symmetrical apparatus structure obtains with respect to storage tubes B and D and twin triode 18 as has been detailed with respect to storage tubes A and C and twin triode 17.

Specifically, the read-out of storage tube B, (12), is amplified by amplifier 33 and impressed upon grid 34 over grid return resistor 35. Coating triode plate 36 is connected to a separate output from video gating "out" 8, and is connected to a low voltage source of plate voltage supply through resistor 37. Similarly, the read-out of storage tube D, (14), is amplified by amplifier 38 and impressed upon grid 39 over grid return resistor 40 (and its appropriate bias source). Coacting triode plate 41 is also connected to a separate output from video gating "out" 8, and is connected to a source of low voltage plate supply through resistor 42. In this twin triode cathode 43 receives the current flow from either or both plate circuits 36 and 41; or, putting it another way, supplies electrons to either or both triode sections in accordance with the grid and plate potentials of each. In any event, the voltage appearing across cathode resistor 44 is the result of the cathode plate current flowing through that resistor and partakes of any mixed configuration desired, as has been described.

A separate conductor connects cathode resistor 44 of twin triode 18 to combining amplifier 31 and the alternate combining function of that amplifier is exercised between the two inputs, as has been described.

The output from the combining amplifier is fully according to the format desired for sequential printing upon a uniformly moving motion picture film and so is conducted to red display 45. This is preferably of electronic nature, such as a cathode-ray tube, with, in this case, a red light-producing phosphor screen. Display 45 is energized for scanning with an output from deflection generator "out" 6 so that the moving spot of light on the cathode-ray tube screen moves in synchronism with the read-out of the storage tubes and is related to the motion of the thus far unexposed film 47 so as to give a suitable vertical height to the image and an appropriate frame line.

Film 47 is protected from ambient light and is otherwise provided with known details of transport, as in a camera or motion picture printer, save that an intermittent motion of the film is not employed. Rather, indexing sprocket 48 provides a precise uniform motion to the film adjacent to the exposure light gate. This sprocket is driven by motor 49, which is accurately controlled as to speed and phase with the process of video tape reading. This is accomplished by servo control unit 9, which is connected to driven sync. generator 2 and therethrough to video tape reader 1. The actual position at any instant of the armature of motor 49 is sensed by an optical output from indexing sprocket 48 and is compared with what this should be from the synchronizing information from entity 2 by means of known nature within servo control 9 and appropriate acceleration or deceleration applied electrically to motor 49.

This completes the description of one channel of conversion apparatus according to FIG. 1. Each channel is essentially monochrome, but can be given the video amplitude characteristic of one color component, as has been described. The luminance information according to red enters this channel at conductor 46 from color signal decoder 10 and leaves in the form of red light reflected by dichroic mirror 50, to be focussed by lens 51 upon film 47.

In an equivalent manner, luminance information in the form of a video signal according to the color component green in the original field of view, as video taped and subsequently reproduced and decoded, passes through conductor 53 from color signal decoder 10 to green channel 54. This channel has all of the elements previously detailed for the red channel. The green channel connects to green display 55 which, in turn, provides a green light beam for transmission through both dichroic mirrors 56 and 50 and through lens 51 onto film 47 in optical registry with the previously mentioned red beam. This is for simultaneous exposure of a color film by all of the luminous energies involved; i.e., the same kind of exposure as though the film was being exposed to the real colors in the original field of view by means of the known motion picture camera. By simple alteration of the optical system one colored spot of exposing light can be made to precede another, etc.

In a still further equivalent manner, luminance information according to blue passes through conductor 58, through blue channel 59, into blue display 60, and as blue light reflected from dichroic mirror 56 and transmitted through dichroic mirror 50, through lens 51, and onto film 47 in registry with the previously mentioned spots.

While the above description is believed fully adequate to teach one skilled in the art how to practice this invention, reference is made to my Patent No. 2,912,487 of November 10, 1959 for details of the printing mechanisms 45—60.

Card reader 61 in FIG. 1 has been described last in view of the fact that if all video tape processed by the equipment shown is according to one format standard and all film is printed to a given format the card reader is not required. However, a very desirable universality accrues when the operating characteristics of certain apparatus elements can be changed to accommodate different formats and conditions. These go particularly to the relations between the deflection and video gates "in" and "out" and driven sync. generator 2.

It will be understood that the operating characteristics, frequencies and/or timing sequences of these elements can be altered by manually altering circuit adjustments or by operating switches to substitute one set of circuit elements for another set.

As a simpler and more nearly error-free mode of accomplishing these alterations card reader 61 has been provided. This is a known electronic or electrical computer device suited to discern positioned punches in an electrically non-conductive card and to close electrical contacts upon discerning a punched hole at any particular position. According to known programming techniques a card can be prepared to set any desired group of adjustments of the circuit elements described as the mode of operating my apparatus.

The general functioning of the apparatus of FIG. 1 will now be clear but it is important that the process involved be described, step by step, so that my method will be understood.

FIG. 3 shows the waveforms involved plotted on one time scale for writing into the storage tubes, reading out thereof and printing on the motion picture film. Additional rectangles represent the status of the storage tube mosaics and certain designations as to "odd" and "even" single scansions of interlaced television image information. The showing is in some respects diagrammatic, but this is to most conveniently present the relations between the processes occurring.

In FIG. 3 the status of the storage tubes and the commutating waveforms is given above and below a time axis 80—80. The status of the printing process on the film is given above a parallel time axis 81—81 in the lower part of this figure.

The mosaic rectangles about axis 80—80 have to do with the stored video signals at the times indicated. These signals have been stored by the writing-in process occurring previously. In order that a particular image be stored when required and removed before the next field must be stored I have found that a lead of two fields, this being equal to one frame, is a desirable advance in write-in prior to the time when the same information is to be read-out. The distance from point 80 (at the left) to point 82 represents one field, the odd line field is the one diagrammed; the distance from point 82 to point 83 represents the next field, an even line field, and the distance from point 80, left, to point 83 represents one frame, or a complete image.

The rectangle labelled "A odd" above axis 80—80 and extending from point 80, left, to point 82 represents the storage surface of storage tube A (also identified as 11 in FIG. 1) with an odd-line field of video information stored thereon. Similarly, the rectangle labelled "B even" below that axis and between points 82 and 83 represents the mosaic of storage tube B (12 in FIG. 1) with an even-line field of video information stored thereon. There is no significance to the even fields being shown in FIG. 3 below the odd fields except one of spacial convenience and of being of assistance in drawing the trapezoidal commutating waveforms to be described later.

In carrying out the video signal format to motion picture film printing process envisioned in FIG. 3, the United States standard of 525 lines, 60 fields—30 frames per second two-to-one interlace, as promulgated by the Federal Communications Commission, has been used. Similarly, the film format employed has been the ASA standard 35 millimeter size. It will be understood that these are merely illustrative and any two other standards may be used; there being probable minor modifications in the apparatus of FIG. 1 for certain particular cases. Normally, these modifications or adjustments would be accommodated by suitable programming of card reader 61, but in extreme cases it is understandable that something more than this would be required.

Along the lower axis 81—81, point 84 represents an elapsed time of $\frac{1}{60}$ second in the same way that point 82 represents $\frac{1}{60}$ second along the upper axis 80—80, and this correspondence of time carries through the full extent of both axes. There is, however, a $\frac{1}{60}$ second departure from this convention in the case of the even line representations below axis 80—80, but this has no significance beyond requiring that this fact be remembered.

Starting the processing, the apparatus of FIG. 1 is controlled by the entities at the left thereof to read out of storage tubes A and B alternately, a line at a time, a complete stored image. First, line 1 from storage tube A is read out at full video amplitude through amplifier 24, grid 20, cathode 19 of the left section of twin triode 17 because plate 22 thereof is energized at a selected maximum potential. The potential causes the mutual conductance of this section of the twin triode to be normal and so the cathode current to be such as to give a desired amplitude of video voltage across resistor 26. The full energization of plate 22 is signified in FIG. 3 by the maximum amplitude of line 86. It will be noted that this amplitude persists for $\frac{1}{30}$ second. At the same time, energization of plate 23 of the right section of twin triode 17 is zero. The zero amplitude of line 87, lying upon axis 80—80 for this first $\frac{1}{30}$ second, indicates this situation.

Since sequential rather than interlaced read-out is required for printing the film from the stored video information, flip-flop keyer 32 is actuated at line repetition rate from driven sync. generator 2. That is, for $\frac{1}{15750}$ second the input from cathode 19 to the combining amplifier 31 is passed out upon output conductor "II" thereof.

In order that an even line, line 2 as a matter of fact, be read out, an output from storage tube B (12) is required. This is available because plate 36 in twin triode 18 is at a selected maximum potential, as signified by line 88 being at maximum distance from axis 80—80, during this time when even lines are being read out of storage tube B. In FIG. 3, distance above or below the axis does not signify polarity; lines 86 and 88 both signify equal positive potentials on the respective triode plates involved. It will be understood that adjustment of these commutating voltage amplitudes can be used for balancing the read-out system; i.e., to compensate for unequal mutual conductance of twin triodes, unequal storage tube performance, etc. It is to be noted that the output from storage tube D is zero at this time, since the potential of plate 41 of twin triode 18, associated with tube D, is zero, as signified by the zero position of line 89.

Flip-flop keyer 32 keys combining amplifier 31 to pass the input from cathode 43, which cathode has the full output of even line 2 of storage tube B for the second $\frac{1}{15750}$ second. Thus, line 1 is read out of storage A and printed on film 47, then line 2 from storage B, then line 3 from storage A, then line 4 from storage B, and so on, for $\frac{1}{60}$ second, as signified by the upper part of FIG. 3.

The lines were read into storage tubes A and B in the normal interlaced mode; that is, in $\frac{1}{60}$ second the storage tube surface was scanned from top to bottom, with alternate lines left blank. All the odd lines were supplied to the surface of storage tube A and all the even lines to the surface of storage tube B. In the alternate read-out just described, however, the amplitude of the vertical deflection of the reading beam in these storage tubes is only half normal. This is so that when line 2 is being read from storage tube B the electron beam for read-out in storage tube A will traverse the storage tube surface at blank line 2 thereof and be ready to read out line 3 next. In this use of the apparatus of FIG. 1 the vertical scanning supplied by deflection generator "in" 5 is at full storage surface amplitude for read-in and has a duration of 1/60 second, while the vertical scanning supplied by deflection generator "out" 6 has half amplitude in 1/60 second but persists for 1/30 second and thus wipes the surface clean at the end of this longer time.

At the writing-out time of 1/60 second the printing upon the film 47 being exposed is half-way down one frame; i.e., at 84 in the lower part of FIG. 3. This process persists, and at the writing-out time of 1/30 the film 47 is exposed fully down one frame; i.e., to point 85.

It will be noted that this read-out of information has been accomplished in less than 1/24 second required for the traverse of a given point on film past a fixed point at the speed of the uniform motion of the film. The difference between 1/24 second and the write-out time of 1/30 second is 1/120 second. This is the time interval between points 85 and 90 in the lower part of FIG. 3. It will be remembered that film 47 as it is exposed passes through printing machine 48, etc. of FIG. 1 uniformly with respect to time and so an excessively wide frame line amounting to 1/120 second travel would be produced unless other means are employed to alter this situation. The frame line without alteration would be one part in five, or 20% of the total interval between corresponding points in the images along the film. The ASA standard for motion picture camera apertures is 15.6% for the frame line height in relation to the total interval of one frame of image plus one frame line.

In the electronic motion picture printer part of this invention; i.e., elements 47—60 in general, I am able to produce standard frame lines, or any other height thereof desired, by imparting a vertical component of scan to the fluorescent spots of light scanning the film. Specifically, the output from deflection generator out 6 that deflects red display 45, green display 55, and blue display 60, is provided with a small amplitude of vertical sawtooth scanning that moves the spots against the direction of motion of the film. In this way a greater length of film is occupied by the many horizontal traverses of the image than without this deflection, and so there is less distance along the film remaining for the blank interval of the frame line. During the frame line interval on the film; i.e., from point 91 to 90 in the lower part of FIG. 3, the vertical deflection sawtooth executes a quick return, in order to be in position for the next gradual motion against film travel in the next film frame.

The blank area of the frame line required for the film is provided by a complete clamping to zero of all read-out commutating waveforms for 1/120 second each 1/30 second for the operation of printing motion picture film from U.S. standard video tape. This is shown in the upper part of FIG. 3 by all dotted lines being clamped to the axis 80—80 at 92. In FIG. 1 this is accomplished by suitable contact being established in card reader 61 to program video gating out 8 to impress this clamping from pulses obtained from driven sync. generator 2.

At the beginning of the exposure of the next frame, point 90 along axis 81—81 in FIG. 3, a somewhat different sequence of events is started. This is at point 93 along axis 80—80. At will be understood from the diagram of FIG. 3, the odd lines for the second frame of motion picture film are initially taken from storage tube C and even lines throughout the second frame from storage tube D. Accordingly, the commutating waveform for tube C rises rapidly at point 93. It reaches full amplitude at 94 in less than the time for one line to be scanned; that is, in less than 1/15750 second. Similarly, the waveform to allow read-out of video information to flow through the system from storage tube D reaches a maximum at 95. (It will be remembered that polarity is not indicated along axis 80—80; points 94 and 95 both represent full gating waveform output, both being positive voltages upon corresponding plates 23 and 41 of triodes 17 and 18 of FIG. 1.)

Sequential read-out then occurs from storage tubes C and D; lines 1, 2, 3, 4, 5, etc., for 1/120 second; i.e., to point 96.

I now start a transition in the amplitude of the odd line video information taken from storage tube C to the second use cycle of information stored in storage tube A. In processing from video tape to film the storage tubes are immediately read-into as soon as read-out is accomplished. In the case of storage tube A the prior read-out is completed at time 1/30 second. Write-in starts then and is completed as to all odd lines of an image at 3/60 second; i.e., point 96 in the upper part of FIG. 3; and this time interval is labelled, "Video into A."

It is understood that a preferable type of storage tube is one in which the read-out removes the stored information. The tubes previously specified can be operated in this manner.

The read-out scanning of storage tubes C and A is synchronous, so that both scan the same line at the same time. However, any output from storage tube A during the second read-out has not been able to thus far reach cathode 19 of twin triode 17 because plate 22 has been at zero (or a small potential). This persists until point 97 is reached.

Thereafter, an upwardly inclined section of commutating waveform 98 increases the voltage at plate 22 linearly from the cut-off value for the triode section to the maximum normal value in 1/60 second and causes the contribution of the video waveform from storage tube A to increase from zero to full output in that period of time. In a reciprocal manner the contribution from storage tube C decreases from maximum to zero in the same interval of time, according to line segment 99, which represents the voltage on the plate 23 of the right-hand section of triode 17, also down to cut-off.

The sum of the contributions from both storage tubes C and A during this transition is always 100%, so that the amplitude of video signal is constant at the uniform value chosen for the exposure of film 47. What is accomplished is a judicious blending of video information existent at the time corresponding to the formulation now stored in storage tube C with video information existent at the later time corresponding to the formulation now stored in storage tube A. In this way the video information is "up-dated," the older information discarded, all by a gradual process and the "strobing" effect previously discussed minimized.

The transition from storage tube C to storage tube A has been shown as linear but these may be any two inverse functions, and different effects are obtained depending upon the variation of the functions with time. Also, for eliminating marginal effects, or for compensating for limitations of various kinds, the amplitude of the combined functions may increase above the 100% norm, or decrease therefrom, and according to a selected function of time.

In writing-in the video information to any of the storage tubes in the normal interlaced television mode there existed the standard vertical blanking interval at the end of each field. This amounts to about 7% of the time required for scanning one field (of 1/60 second). However, in forming the read-out vertical scanning waveform in deflection generator "out" 6, no such provision is made. The scanning is continuous throughout one complete frame so that one frame may be uninterruptedly printed upon film 47. The frame line on the film is formed as a consequence of the faster read-out than film travel and this is equalized to give any desired height of frame line by vertical deflection of the writing spots in the electronic film printer, as has been explained.

The transition phase recited above continues to the conclusion of the second thirtieth of a second of operation; i.e., to point 100 on axis 80—80. Thereafter, for 1/120 second, the full amplitude of odd line information comes from storage tube A, while the even line information continues to come from storage tube D. At the end of this interval, point 101 on axis 81—81, the second motion picture frame has been fully read out. All commutating waveforms are again clamped to zero for 1/120 second, as identified at 102. By means of vertical deflection of the writing spots the second frame line on the film, extending from 103 to 104, is formed.

Immediately subsequent to the prior write-in interval of time, from 1/30 second to 3/60 second when odd line video information was being written into storage tube A, corresponding even line information was written into B, in the interval from 3/60 second to 2/30 second. This is the natural sequence in interlaced television scanning; the odd lines being scanned in one-sixtieth of a second and the even lines of the same image being scanned in the following one-sixtieth of a second.

As soon as the read-out of storage tube C has been completed at point 100, the next video field of odd lines is read thereinto. This results in storage tube C containing odd lines of information and storage tube B even lines of information which are available for read-out at time 5/60 second; point 104. By means of a full amplitude of commutating waveform 105 passing the video information from storage tube C by fully energizing plate 23 of twin triode 17 and by full amplitude of commutating waveform 106 passing the information from storage tube B by fully energizing plate 36 of twin triode 18, the next frame of motion picture film is printed by information from storage tubes C and B exclusively. This continues for 1/30 second, to 7/60 second.

All waveforms are again clamped for 1/120 second at 107 and film frame line 108 is formed as has been previously explained.

During the 1/60 second just prior to the 7/60 point, odd line video information is written into storage tube A, and just subsequent to this interval even line information is written into storage tube B. By examining the write-in sequence along the whole of the upper part of FIG. 3 it will be seen that odd line and even line writing occurs in sequence, one after the other, continuously, in the usual manner of interlaced television scanning. Consequently, the sequencing by video gating "in" 7 is simple and involves only distributing the relatively continuous flow of video information read off the video tape in video tape reader 1 to the proper storage tube in a systematic manner.

Video information for the fourth frame of motion picture film is read from storage tube A, for the odd lines, and from storage tube B, finally, but from storage tube D initially, then with a dissolve from D to B, for the even lines.

At the end of the clamping interval waveform 109 rises to full amplitude to place full operating voltage on plate 22 of twin triode 17 and thus passes the video information being read out of storage tube A. This situation continues for the full 1/30 second required to print the fourth motion picture frame.

In an initially similar manner, waveform 110 rises to full amplitude to place full operating voltage on plate 41 of twin triode 18 and thus to pass video information being read out of storage tube D. This situation continues for only 1/120 second, and at 111 a decrease toward zero starts and is completed in 1/60 second. Simultaneously, an increase from zero starts at 112 on the waveform to energize plate 36 of twin triode 18 so that video information from storage tube B is passed through that triode to reach full amplitude in 1/60 second and to persist thereat for 1/120 second to point 113.

This transition from storage tube D to storage tube B effects the same homogenization of time for the even lines of video information in frame four of the motion picture film as did the previously described transition for the odd lines in frame two. As has previously been the case, a film frame line is formed at 114.

The pattern of write-in of video information in interlaced manner upon four storage tubes, the read-out of the same in sequential manner for printing upon motion picture film the transitional switches to up-date video information occurring in an odd-line-even-line-odd-line-even-line sequence will be grasped from FIG. 3 and the detailed explanation thereof.

The required shapes of the commutating waveforms may be taken directly from FIG. 3. Consider the commutating waveform for the read-out of storage tube A. This is applied to plate 22 of twin triode 17. The waveform rises to full amplitude at the start of the sequence shown and maintains this amplitude at 86 for 1/30 second. It is then clamped to zero for 1/120 second at 92 and continues at zero for the following 1/120 second. Thereafter, at 97, a rise begins, shown linear, from zero to full amplitude in 1/60 second. The maximum amplitude persists for 1/120 second and then is clamped to zero for 1/120 second at 102. The waveform for A then remains at zero for the following 1/30 second and a further 1/120 second clamping interval at 107. Finally, it rises immediately thereafter, at 109, and remains at maximum amplitude for 1/30 second, to point 113, after which it is clamped to zero for 1/120 second.

An epoch has been shown in FIG. 3. The next epoch contains the same sequence of events, but with storage tube C substituted for storage tube A for the odd lines, and vice versa; and storage tube D for storage tube B for the even lines, and vice versa. Thereafter the sequence is repeated with storage tubes A and B acting as shown in FIG. 3.

A full sequence of operation of the system is thus completed upon eight frames of film being printed, but the partial sequences of four frames are alike save for the specific storage tubes employed at specific times in the sequence. The time interval for completing the epoch shown in FIG. 3 is 1/6 second and for the complete epoch it is 1/3 second.

The shape of the commutating waveform for storage tube A is shown for a complete epoch of 40/120 second (i.e., 1/3 second) in FIG. 4.

It will be noted that the fundamental waveshape is a positive pulse of rectangular shape having a duration of 4/120 second (=1/30 second) repeated after a zero axis blank period of 11/120 second, save at the end of the complete epoch, where the zero axis interval between pulses is only 6/120 second (=1/20 second). In addition, there are two asymmetric trapezoidal-shaped pulses positioned as mirror images about the central of the three rectangular-shaped pulses.

The waveshape of FIG. 4 can be formed from a combination of repetitive waveshapes and gating devices coacting to produce the particular combination required. One such combination is as follows.

A pulse oscillator is provided in the video gating "out" entity 8 that has a pulse repetition rate of 1/8 second (=15/120 second) and a rectangular pulse of duration 1/30 second (=4/120 second). This is synchronized to the over-all system operation by a connection to driven sync. generator 2, from which latter pulses of higher frequency are obtained to be impressed upon the pulse oscillator. It is preferable that the front edges of the synchronizing pulses be synthesized from horizontal synchronizing pulses having a repetition rate of 15,750 cycles per second. This insures that the commutating waveshape will having a leading edge precision, as at 120, 121, 122, etc. in FIG. 4 such as to start printing video information onto film 47 at the same horizontal line in each frame. In other words, this prevents losing a few lines at random in various frames of the printed film. If the nominal precision of the wavefront of a 1/30 second pulse was all that was employed for this purpose such a variation would take place. However, with the precision synthesizing method described, this does not take place.

Each 1/3 second a re-synchronization of the pulse oscillator forming pulses 120, 121, 122, etc. takes place. This is accomplished by gating-in a single pulse having this repetition rate and also having a precise leading edge as has been described.

Both the pulse oscillator and the re-synchronization oscillator may be driven multivibrators, as the one of FIG. 22, page 469 of the fourth edition, 1956, of "Reference Data for Radio Engineers," International Telephone and Telegraph Co. Other equivalent circuits may also be used.

The trapezoidal wave shape components 123, 124 must be separately gated-in. A repetitive sawtooth waveshape having a duration of 3/120 second (=1/40 second) and an increasing shape, as from 125 to 126, in FIG. 4 is formed by known sawtooth generators. This is gated into the composite waveshape of FIG. 4 by a suitable gate having an open duration of 3/120 second and a repetition rate of 1/8 second, phased 6/120 second (=1/20 second) behind the initiation of the complete epoch starting at point 120 in FIG. 4.

A similar repetitive sawtooth waveshape 127, 128 having a decreasing shape is similarly formed and is gated-in for one cycle of 1/40 second as before, but phased at 25/120 second (=5/24 second) behind the initiation of the complete epoch.

As indicated by the dotted portion of the sawtooth waveforms at 126 and 127 these portions are clipped off in a clipper that cuts off all amplitudes of the waveshape at a given level, as at 123—124. An additional clipper may be employed to insure that the axis (which may be designated as "0–40") is at a uniform level. It should be noted that high precision in the clipping function is not required, since this commutating waveform is the plate voltage for plate 22 in triode 17 of FIG. 1. Nominal precision of the maximum positive value (123—124) is desirable so that the video amplitude of the output from storage tube A will be uniform, or that it will have an intended corrective shape. However, once that the triode section has been cut-off by the required plate potential in relation to the grid bias a few more volts negative in the plate potential will not make any difference; thus uniformity of the zero axis is not important.

It is also to be noted that extreme precision in the timing of the truncated portions of the composite waveshape of FIG. 4 is not required. These merely blend one field of information into another. The sum of the reciprocal waveshapes should equal one, but whether or not the process extends one or two lines longer or shorter is not important.

Implicit in the scanning waveshape of FIG. 4 is the clamping waveshape, which brings all outputs of the video gating "out" entity 8 to zero at prescribed times, such as 92, 102, 107 and 113 in the upper part of FIG. 3. This clamping waveshape is a repetitive pulse occurring after each 1/30 second of read-out and having a duration of 1/120 second. It may be formed by a driven multivibrator similar to that already referred to, wherein the pulse duration is 1/120 second and the interval between pulses is 1/30 second. The repetition rate is thus 5/120 second, =1/24 second. This pulse is provided with accurate front and back edges so that the stopping and starting of reading-out is within one line of video information. This precision forms the return-to-axis at time 9—126 of the sawtooth in waveshape of FIG. 4 and so the return time of the original sawtooth need not be extremely precise, as was mentioned.

It will be understood that additional composite waveshapes similar to that of FIG. 4 are synthesized for each of the other twin triode plates 23, 36 and 41. The required shapes are given in FIG. 3 in the variously dotted lines and the means for synthesizing them will be apparent from the above description for waveshape A. Each waveshape is uniquely phased in order that each actuates the commutating apparatus at the proper time for accomplishing a single or a combined read-out from storage as has been described.

We now turn to the consideration to video tape to video tape conversion of format, as for example, from the United States standard of 525 lines, 60 fields—30 frames per second, two-to-one interlace, to the British standard of 405 lines, 50 fields—25 frames per second, two-to-one interlace.

The equipment required to accomplish this process is shown in FIG. 2, which is a modification of FIG. 1. The differences between the two figures lie principally in the use of two storage tubes in FIG. 2 in place of one in FIG. 1 in each position, the use of auxiliary apparatus required because of the additional tubes and the use of a video tape recorder instead of an electronic motion picture printer for the output recording device. However, the mode of operation is considerably different and illustrates the universality of my over-all method and apparatus.

In FIG. 2, entity 134 is a color video tape reproducer, similar to video tape reader 1 in FIG. 1. A driven sync. generator 135 provides U.S. and British television scanning standard pulses that are accurately timed with respect to the reproduced video signals and sync. pulses from reproducer 134, particularly by means of the 240 cycle control track tone previously recorded on the video tape now being converted from the U.S. to British standards. Suitably sequenced synchronizing signals are provided from generator 135 to various elements of the equipment of FIG. 2, as is shown by the conductors with arrows directed away from the generator, and as will be more fully described later.

As before, the color video signal is provided for the conversion apparatus in the form of three amplitude modulated signals, each carrying luminance information of one primary color, by a color signal decoder 136.

In this embodiment the storage tubes are grouped in pairs; A, A'; B, B'; C, C' and D, D'. In FIG. 2 these tubes have been shown in greater detail than in FIG. 1. The same write-in, read-out type is employed, and may be the Pensak Graphecon, the RCA C73972, the RCA 7539, or equivalent. All tubes employed in any one embodiment are preferably identical. For purposes of illustration storage tube A is further described as consisting of the tube proper, having write-in electron gun end 137 and read-out gun end 138. Deflection for the writing electron beam is provided by deflection coils 139, consisting of two pairs, to provide both horizontal and vertical scanning and thus the well-known television raster upon storage surface 140. Deflection waveforms for write-in are according to the United States standard; i.e., a sawtooth of 15,750 cycles per second for the horizontal deflection and a sawtooth of 60 cycles per second for the vertical deflection.

Deflection for the reading electron beam is provided by deflection coils 141, similar to coils 139, but supplied with deflection waveforms for read-out according to the British standard; i.e., a sawtooth of 10,125 cycles per second for the horizontal deflection and a sawtooth of 50 cycles per second for the vertical deflection.

Video information from decoder 136 passes to video gating "in" entity 142. There, under the supervisory control of card reader 143, the video information is channeled in sequence to the four groups of storage tubes. Each storage tube of each pair, as A and A', receive the same video information at the same time. Indeed, the reason for providing two storage tubes in each group is because more video information than can be stored in a single field of information is required for the format conversion. The card reader is of the known IBM punched card type in which contacts are either made or left unmade, according to whether a punch mark is present or absent at any particular position among many such positions upon the card.

Thus, for each conversion desired a particular card is prepared. One such card, or alternately one group of cards, suffices to program my equipment for the United States to British conversion. Another card, or group, programs for the British to United States format. Still another card or group programs from United States to the French 819 line standard, etc., etc.

In addition to what is termed static reading, in which a direct current circuit including a relay is constantly energized by a punched contact condition, dynamic reading may be employed to form basic pulse patterns. In this case the completed contacts, or lack of electrical contact, are repetitively sampled by a commutating contact, mechanically; or an array of gate and logic elements, electronically.

The need for usual scanning waveforms has already been shown. Video gating "in" waveforms are required to write into the pairs of storage surfaces in sequence, an odd field in one pair, an even field in the next. Commutating waveforms, for assembling the converted video information as required from the four groups of storage tubes, are shown in FIGS. 5 and 6 and will be detailed in the description of these figures.

The management of the storage entities provided is handled to provide what I term "time homogenization." This embraces providing stored information in such form and extent that at any instant of time video information appropriate to that time is available and can be read out to form a video signal according to the revised format.

The distribution of video information into the several groups of storage tubes is accomplished by the video gating entity 142 under the control of card reader 143. When the reader provides information to establish a nominal working bias upon the gun structure for beam 137 in storage tube A, video information from decoder 136 is impressed as a modulating voltage upon the grid for write-in beam 137 and is thus written upon mosaic 140. When this mosaic has been written upon with one field, say an odd field, then a cut-off (beam extinguishing) bias is impressed upon the gun at 137 and no further video information is impressed upon storage tubes A and A' until further along in the processing. (The two tubes are fed from the one video gating "in" connection; see FIG. 2.)

Video gating in entity 142 is the prime determination as to what is written upon the mosaics of the storage tubes; however, deflection gate "in" entity 144 determines whether or not scanning deflection coils 139 shall be energized from constantly operating deflection generator "in" 145. In order that the mosaic 140 shall not be damaged, stoppage of scanning is never ordered by card reader 143 unless the writing gun at 137 has been biased to extinguish the electron beam. Also, in order that the raster not be disturbed when scanning is stopped or started, a transient signal opposed to the one known to be caused by the inductance of the deflection coils involved is inserted in the deflection channel along with the command to alter scanning. In this way, alterations of the scanning writing pattern are arranged for partial writing-in. While the entities 144, 145 and 139 have been shown single, these embrace both the horizontal and the vertical scanning processes, independently controllable. This detail has not been shown in FIG. 1 as well as not in FIG. 2 but the same coaction is involved between entities 61, 15 and 11, for example.

In a similar manner, the scanning format required for removing the video information from the storage tube mosaics is set by card reader 143 in deflection generator "out" 146 and is controlled in deflection gate "out" 147. Appropriate outputs are provided for each pair of storage tubes in the same way that each pair was controlled as to input deflection. In the illustrative "A" case, this output goes to deflection coils 141 for storage tube A and to deflection coils 148 for storage tube A'. The format of the "out" scanning is, of course, that of the standard to which the video information is to be converted. In the illustrative case, the British standard requires 10,125 cycles per second sawtooth for horizontal scanning and 50 cycles per second for vertical scanning.

The various elements associated with each of the eight storage tubes is the same as detailed with respect to pair A and A' and thus will not be detailed. The sequence of operation of each pair is unique, but this will be discussed later.

However, because there are two tubes in a storage pair an additional element is provided for each that is not to be found in the prior FIG. 1. This is video switch 150 for pair A, A' and corresponding switches for each of the other pairs. A video input, originating from the collector of the reading section at terminal 151 of storage tube A is one input to video switch 150. Another is the companion video input from the collector of storage tube A'. A third input is from storage switch control 152, an entity in turn under the control of card reader 143 and actuated to provide an output from either storage tube A or storage tube A'. This output passes to amplifier 153 for amplification in order to appear upon grid 154 of twin triode 155 at a level of a number of volts. Amplifier 153, is in a sense, illustrative of amplification of the outgoing signal and I prefer to employ part of the total amplification between each output terminal, as 151, and the switch 150 to insure a desirable signal level for switching and the remaining applied amplification at the output of the switch, at 153, as shown. Obviously, two individual amplifiers are required for each pair of storage tubes, as A and A', whereas one amplifier 153 serves to amplify either video signal after it has been selected by switch 150.

Twin triodes 155 and 156 are constituted and function exactly the same as their counterparts 17 and 18 in FIG. 1. Namely, by the presence of commutating voltages upon a plate thereof, the video signal upon a grid passes through the section of the triode involved and appears as a voltage across the common cathode resistor for diagonally connected storage tube pairs, as A and C, and so on.

Also as before, combining amplifier 157 allows only one of the two available outputs from the common cathodes to pass. This alternate keying is arranged by flip-flop keyer 158, which is actuated from one pass and the other block to the opposite condition under the drive of driven sync. generator 135. Accordingly, video information from only a single storage tube surface or a diagonally opposite storage tube surface in combination is passed on to color video tape recorder 159 for recording in the new format; British in the example chosen. This behavior will be understood from the prior description in connection with FIGS. 1, 3 and 4 and will be further understood for the new example upon consideration of FIGS. 5 and 6.

An additional control is required in FIG. 2. This is the reading control 161. This entity is controlled by card reader 143 as to the format involved for any particular conversion, and from driven sync. generator 135 for actuating information. Its purpose is to control the intensity of each reading electron beam, mainly as to being off or on. While the video switches, as 150, determine which stored information shall pass to the twin triodes and combining amplifier 157 determines what information shall reach tape recorder 159, the sequence required for conversion from one standard to another does not allow stored video information to be read out until it is required. Consequently, reading control 161 sets a bias on each of the eight storage tubes A through D' to allow read-out when this is required, either for useful video output to be recorded, or for erase in certain instances, and to inhibit read-out when the stored information is not to be taken out at a particular raster scan but at a later scan or a later portion of a scan. In FIG. 2, conductors pass from reading control 161 to each of the reading gun beam controls, as 138 for storage tube A.

As previously detailed in FIG. 1, so the part of FIG. 2 that has been described constitutes one video channel. This may be employed alone for monochrome conversion of format; or, as indicated, may constitute one channel of a color system, the green. In the latter instance, duplicate channels are employed for the other colors; as 164 for red and 165 for blue. Each of these channels is connected to color signal decoder 136 to receive video information corresponding to the particular color, to driven sync. generator 135 for synchronization and to color video tape recorder 159 to deliver an output according to one color component.

For a two color system, but two channels of the three described are required, and other combinations may be effected. It will also be understood that certain details discussed in connection with FIG. 1 also apply with respect to FIG. 2, as the equalizing of storage tube outputs by altering operating voltages on the plates of twin triodes 155 and 156, etc.

The operation of the apparatus of FIG. 2 is more fully understood by reference to FIGS. 5 and 6.

In the upper part of FIG. 5 the waveforms of combinations of amplitudes of read-out of stored video information as a function of time are plotted in relation to the systematic write-in of this information in each pair of storage tubes. In the lower part are shown simulated reconstituted rasters according to the new standard; i.e., the British, with the source of the video information set down for each significant part of each raster.

Along line 180—180 are indicated time intervals of $\frac{1}{60}$ second from 1 to 12, plus one additional to indicate the repetition of the cycle, each labelled with the storage tubes having video information therein as of the time interval specified. Such information has been previously read into the several pairs of storage tubes in sequence by the write-in functioning of the apparatus of FIG. 2, as has been described.

It will be recalled that information is read into each of each pair of storage tubes simultaneously. That is, into tubes A and A′ for the first $\frac{1}{60}$ second, into B and B′ for the second $\frac{1}{60}$ second, into C and C′ for the third $\frac{1}{60}$ second, etc. In FIG. 5 the precessing delineated starts at the instant that video information has been completely written into storage tubes A and A′ and this information is thus available to be read out.

Odd line information from the United States standard is available in the A and A′ tubes. At time $\frac{0}{60}$ second, read-out according to the slower British standard is inagurated. This continues for $\frac{1}{50}$ second, during which time the raster indicated in the lower graph of FIG. 5 is executed with odd lines from top to bottom. For $\frac{1}{60}$ second the video information is extracted wholly from the storage surface of tube A.

This information has preferably been written upon this surface in an astigmatic manner. This merely calls for half normal vertical deflection, or for an astigmatic electron beam spot. That is, although the horizontal size of the spot remains normal for good resolution the vertical dimension has the form of a short line, the length of which is just sufficient to close the distance between otherwise spaced odd lines of a television raster. The astigmatic property is required so that a solid image is formed on the storage mosaic. The number of lines read out are fewer than the number put in in this U.S. to British conversion and any variation in the amplitude of read-out signals due to scanning between lines of the stored image cannot be tolerated. It will be understood that a change in the number of lines will nearly always occur in changing from one television format to another.

For the $\frac{1}{300}$ second remaining at the bottom of the raster in the A storage tube odd line read-out I combine the video information from that storage tube with the information from the next odd line storage tube C. This takes place on an A-decrease, C-increase basis according to my method of up-dating video information. While this particular combination in itself is small and might be eliminated in a modification of my basic embodiment it is the forerunner of transitions to come in every other field and so is included for sake of completeness and for consistency in the functioning of the apparatus.

In the upper part of FIG. 5, above axis 180—180, waveform A will be noted as having a turned-down end portion 181, occupying $\frac{1}{300}$ second. At the same time, though plotted in the C storage area of the figure at 182, a small portion of C waveform rises from zero amplitude for $\frac{1}{300}$ second. As indicated in the lower portion of the first mosaic diagram, at 183, the read-out for this interval of the British format is a combination of video information from both A and C storage tube surfaces. It is to be noted that the amplitude of the A contribution is much greater than that of the C, as by comparing the waveforms at 181 and 182. This is merely one example of the principle involved and in other examples to follow the amplitudes have significant relative values.

In FIG. 5, upper, the waveforms are shown where they have amplitudes above the zero amplitude axis 180—180, but not where the amplitude is zero. This is for sake of simplicity and with this explanation the complete waveform for any read-out of a storage surface will be understood and can be drawn if desired. This has been done for waveform A in FIG. 6.

At point 184, at the end of $\frac{1}{50}$ second of processing and consequently at the end of the first odd line field of the British format, read-out ceases in this respect, and after the usual vertical blanking period, read-out of the first even field starts from storage tube B. It will be understood that the direct time interval of vertical blanking for one television format is quite closely the same as for another and so blank video information positioned at the bottom (and/or top) of each field passes automatically from one format to the other. The amplitude of vertical scanning read-out is set by card reader 143 of FIG. 2 so that the video information is just completely scanned in the net time for image transmission according to the read-out format, regardless of the blanking interval of the writing-in format.

In the second, or even line field, the video information is taken from storage tube B for the first $\frac{3}{5}$ of the field, or until point 185 along waveform B at the top of FIG. 5 and to line 186 at the below-center portion of the second storage tube mosaic representation. Thereafter, for the second interval of $\frac{2}{5}$ of the whole read-out time of $\frac{1}{50}$ second, the video information is a blending of that stored in tube B and tube D. As seen beyond point 185 the amplitude of the B contribution drops $\frac{2}{5}$ and the D contribution increases from zero to $\frac{2}{5}$ by the time the end of the field is reached. The D contribution is shown at 187 in the upper part of FIG. 5. It will be noted that the waveforms shown in the upper part of FIG. 5 are positioned with time as respects write-in, but have significance only as to fraction of a field and amplitude of video signal contributed as to read-out. However, the convention chosen is believed to most clearly present the phenomena occurring.

We now arrive at the second odd line field, identified at the upper left corner as 188. This is formed initially of video information from storage C′ tube, but after $\frac{3}{5}$ of the field this is gradually faded down in amplitude and corresponding but later information from odd line storage tube A′ faded up, being taken from the cycle of operation of this tube identified as 189.

The next field is the second even field identified as 190. This starts with full amplitude from storage tube D′ at 191, but after $\frac{2}{5}$ of the field this amplitude decreases and up-dated information from storage tube B′ increases, being waveform segment 192.

Similarly, the next odd field 193 starts with full amplitude from tube A, but after $\frac{1}{5}$ field this starts to decrease and new information from storage tube C at 194 increases from zero amplitude to nearly maximum amplitude by the time the end of the field is reached.

At this time, point 195, six fields of the U.S. standard format have been written on the storage tubes and five fields of British format have been read out. This completes a sub-interval of the repetitive process, but not a whole interval, as concerns the relation of transitions between storage tubes in the up-dating process.

At point 196 the next even field starts. This is exclusively from storage tube D for ⅕ field and thereafter a combination of up-dated even field B′, at 197.

It will be noted that the slope of all of the combined field amplitudes is the same, corresponding to a change in amplitude from zero to full amplitude, or vice versa, in one field of stored information; i.e., in $\frac{1}{50}$ second for the British read-out. With the increase and decrease of companion waveforms always starting at the same time this insures that the sum of the two such waveforms will be unity. It is not necessary that this one slope be universally employed. As long as the slopes for any companion pair are reciprocal the visual result is as desired. A more rapid rise of up-dated information may be employed to give this information more rapid prominence as long as the companion decay is correspondingly rapid. The rate of rise and decay is determined, of course, by the waveshapes of the commutating voltages impressed upon the plates of twin triodes 155 and 156, and these are determined by the waveforms generated in video gating "out" 162.

Continuing, at point 198 the next odd field is started, coming at full amplitude from storage tube A, at 199. After ⅖ of a field, up-dating to information from tube C′ starts, as shown at 200.

The next field is even, starts at 201 with full output from storage tube B for ⅗ field and then is a combination of decreasing B and increasing up-dated D′ from 202 to the conclusion of the field.

The next field is odd, starts at 203 with full output from storage tube C for ⅘ field and then becomes a combination with brief up-dated output 204 from tube A′ for ⅕ field.

The next field, 205, is even and is taken exclusively from storage tube D, since the image recorded thereon is timely.

This completes a cycle of the conversion process, being identified by point 206 and occurring $\frac{12}{60}$ or the equivalent $\frac{10}{50}=\frac{1}{5}$ second after the start at time $\frac{0}{60}$ second along axis 180—180. It will be noted that the times according to the British format are given along the lower axis in FIG. 5; i.e., axis 207—207.

In FIG. 5 the start of the next cycle of operation has been shown at 208 to indicate how the process repeats. The first and last fields along axis 207—207 are identical. Along axis 180—180 certain omissions and additions will be noted. This is because the up-dated increments from the processing occurring prior to time $\frac{0}{60}$ were not put in, since it would not have been obvious where these came. The increment at 204 is illustrative of an increment omitted in the first cycle.

The omission of read-out from certain storage tubes will be noted even in the center of the cycle presented. In the conversion taken as an example this actually occurs. However, in other conversions having different field duration ratios, say 20 fields per second for scientific data that could be accumulated only that rapidly to the U.S. standard of 60 fields per second for presentation to closed circuit or broadcast audiences, it will be appreciated that a very different storage cycle exists. By having two storage tubes, each having the same video information read into the storage mosaics, I am able to supply timely information for any combination of formats and so to effectively present an original "field of view" for scanning pickup at the different line and field rates of a different television format.

FIG. 1 is to be considered a special case of the apparatus of FIG. 2. In the former different terminal apparatus functions and only a part of the whole apparatus available is used. By providing flexible waveform forming sources in the deflection and gating entities of FIG. 2 and by preparing computer cards for the card reader to actuate the required waveforms, or to provide initiating data for such waveforms by repetitive sampling (as mentioned), the overall computer-like conversion apparatus is effective in accomplishing almost any desired conversion of formats. Two such examples have been fully described.

In noting the lead of up-dated video information in FIG. 5 it will be understood that video information is normally written into the apparatus of FIG. 2 $\frac{1}{30}$ second before it is used for read-out. This does not signify a lack of timeliness, since the quality of the conversion depends upon the relative timeliness of one field to the other, not upon an overall delay in the process. Any such overall delays in this processing are so small as not to be perceptable to an observer. He will not be able to discern whether the whole presentation is $\frac{1}{30}$ second late, but he will be able to discern intra-field shortcomings which my up-dating process mitigates.

Video tape readers have been shown in both FIGS. 1 and 2 as a source of television signals, but it will be understood that these can be replaced by known live television pickup equipment. The input requirement of my apparatus is merely a video signal complete with the synchronizing and blanking pulses associated with its formation. This might normally be supplied as a complete composite signal, as from video tape, but now that the details of the apparatus have been given it will be seen that the originating equipment may be a black and white or a color camera chain, or a group of these with selective switching and cross-fading therebetween, as employed in known television studio or remote pick-up operation. The video signal source may also consist of a motion picture film or slide scanner, either flying-spot or optical projection type.

The synchronizing signals need not be combined as a composite input signal, but may be very effectively impressed directly upon driven sync. generators 2 or 135. Blanking signals are not required as long as the return traces of camera tubes or other spurious lines are not present in the net image area. This is because the blanking signals for the new format are inserted when that format is developed and prior such signals have only nominal value in that connection.

In the same manner in which an illustrative waveform was separated from the several required and the means for forming it recited in connection with FIG. 4 for the apparatus of FIG. 1, FIG. 6 illustrates the shape of the commutating waveform required to be formed by video gating "out" entity 162 for application to the plate electrode adjacent to and coacting with grid 154 of twin triode 155 in FIG. 2. This waveform allows read-out of storage tube A. At the required periods of time collector output 151 of tube A is switched by video switch 150 through amplifier 153 and the video component from the A storage mosaic appears as a voltage on grid 154.

FIG. 6 is to the same time scale as FIG. 5 and the $\frac{1}{300}$ second points along axis 210—210 in FIG. 6 are numbered successively from 0 to 60.

Immediately upon initiation of the conversion readout process the commutating waveform 211 reaches full amplitude at 212. Consideration of the desirable amplitude of this voltage and other details of commutating waveform formation were given in connection with FIG. 4 and will not be repeated.

The fundamental pulsation of waveform 211 is a pulse of full commutating amplitude having a duration of $\frac{5}{300}=\frac{1}{60}$ second repeated periodically each $\frac{20}{300}=\frac{1}{15}$ second. This is easily formed in gating entity 162 by a multivibrator oscillator and synchronized from driven sync. generator 135. With this is combined a portion of a sawtooth also having a duration of $\frac{5}{300}=\frac{1}{60}$ second also repeated periodically each $\frac{20}{300}=\frac{1}{15}$ second and in the same time phase repetition-wise. The latter waveform is also easily formed as a 60 cycle sawtooth from which one out of each five sawteeth is gated to a combining circuit by a separate output from the fundamental pulsation just mentioned. The polarity of the sawtooth is negative with respect to the fundamental rectangular pulses previously described and thus causes the slant cuts from the maximum amplitude of the rectangular pulses.

The various depths of the slant cuts required on successive cycles are obtained by providing a different bias upon the sawtooth for "mounting" purposes. The small cut represented dotted at 213 on the first pulse 211 is obtained by passing the cycle of sawtooth involved through a clipping stage. This may be a cut-off type grid bias clipper with the portions of the sawtooth as at 213 the most positive portion of the waveshape. The rest of the sawtooth is then too negative to exceed the cut-off bias and is not reproduced in the output plate circuit. The part 213 is reproduced as a negative voltage in the plate circuit because of the well-known 180° phase inversion of voltage in a vacuum tube. Thus, this can be combined directly with the fundamental pulse previously mentioned and then appears as the slant cut 214 rather than as a separate dotted portion thus shown in FIG. 6 for explanation.

The different biases required for each of the three pulses making up a cycle for commutating waveform A of FIG. 6 may be obtained as follows. A sawtooth waveshape of relatively very low frequency and low amplitude is superimposed upon the clipper previously described in addition to the gated sawtooth waveshape employed to make the slant cut. The phase of the low frequency sawtooth is such as to reach a maximum positive value during the duration of the second desired pulse 215, a minimum positive value at the first desired pulse 212 and an intermediate positive value at the third desired pulse 216. It will be recalled that the fourth pulse, 217, is merely a repeat of pulse 212 at the start of the second cycle.

The low frequency sawtooth waveshape is applied to the grid of the clipping stage previously described and the combination of the two waveshapes gives the output waveform required. It will be noted that the low frequency sawtooth preferably has a long return time and having the appearance of an asymmetric triangular waveshape. The phase thereof is adjusted to provide a passed slant cut part of the $\frac{1}{60}$ second sawtooth having a duration of $\frac{1}{300}$ second for commutating pulse 212, $\frac{4}{300}$ second for pulse 215 and $\frac{3}{300}$ second for pulse 216. By suitably phasing the low frequency sawtooth to place the desired pulses at necessary parts of the main sawtooth or the slow return trace thereof it will be seen that the 1:4:3 ratio required can be realized. Non-linearity of the low frequency sawtooth will also accomplish the same thing. The maximum positive voltage excursion of this waveshape is at or near the pulse 215, as applied to the clipper.

As previously described in connection with FIG. 4, completion of the commutating waveshape is accomplished by clipping the waveshape formed by the synthesis described. That is, the positive peak level, as at 211 and other peak values, is made uniform by passing the synthesized waveshape through a positive peak clipper. If there are serious axis distortions the zero axis is also clipped; either by passing the synthesized waveform through a double clipper, or by successive clipping in two clippers.

The synthesis of commutating waveforms for the other storage tubes is carried out in the same way as has been detailed above. The shapes of the waveforms required are given at the top of FIG. 5.

Certain important alternate embodiments of my apparatus and modifications of my method of video conversion exist and one is shown in FIG. 7.

In FIG. 1 film 47 is a so-called monopack color negative. The three primary color components are therefore combined optically and the multicolor result impinged upon the one film.

Another important mode of motion picture film processing involves the use of color separation negatives, "three-strip" negatives, etc. From the designation it is clear that three separate film strips are involved in the processing and in the present invention as one form of recording medium. In the general case, the films may merely be silver emulsions which provide monochrome densities proportional to the inverse of the intensity of the color involved in the three color information channels; or the color of each channel is reproduced by the printing-out cathode ray tubes involved and that color reproduced upon the appropriate film strip either directly or indirectly.

The three film strip apparatus is shown in FIG. 7 in combination with an astigmatic means of eliminating the line structure characteristic of scanning processes in the final film record. As will later appear, the astigmatic means may also be applied to the printer of FIG. 1.

In FIG. 7 are found five Roman numerals "II," at indicated terminals. In FIG. 1 a similar grouping of five "II" terminals will also be noted at the right-hand lower part of that figure. When the alternate apparatus of FIG. 7 is to be used the apparatus below these terminals in FIG. 1 is replaced by the apparatus in FIG. 7. To the extent that my apparatus is constructed as a universal computer-like device in any particular embodiment this modification can be accomplished automatically by a five-pole plural-throw switch actuated by a relay under the control of suitable punchings in the format card placed into card reader 61 in FIG. 1. This aspect has not been shown in FIGS. 1 or 7 for tutorial clarity, but the concept is fully understandable in view of the teaching of this specification.

Conductor 222 previously connected from driven sync. generator 2 to servo control 9 in FIG. 1, but now connects to servo motor 223 in FIG. 7. The function is to maintain the servo motor in true step with the reproduction of video information from tape reader 1, as will be understood from the prior description of FIG. 1.

The apparatus to the left of the motor in FIG. 7 is shown in front elevation. The three film strips to be exposed are 224, 225 and 226. These are driven uniformly by corresponding sprockets 227, 228 and 229, which are spaced along common shaft 230. In this embodiment this spacing is necessary, or at least convenient, so that the three films are each centered in front of the cathode-ray reproducer which serves to expose that film.

Cathode-ray tube or equivalent flying spot reproducing means 231 is of the general nature of blue display 60 in FIG. 1, but is shown in greater detail here than in that figure. Means 231 is also of the general nature of the printing tubes (48, etc.) of my prior Patent 2,912,487. In FIG. 7, the cathode-ray tube 231 has a blue light-emitting phosphor if a film is to be exposed with blue light for any reason, or any monochrome or "white" light-emitting phosphor if a silver emulsion or equivalent monochrome record is to be made upon film 224. In a similar manner, cathode-ray device 232 exposes a green or monochrome record on film 225 and cathode-ray device 233 exposes a red or monochrome record on film 226.

At 221 the lines indicate the more-or-less raster normally seen on the fluorescent screen according to my invention. The fact that more than one line is apparent is because of the deflection of the spot against the motion of the film to provide standard frame lines, as has been explained. A similar raster appears on each of the tubes.

Each of these rasters is focused on the adjacent film intended to be exposed by a lens; 234 for the blue, 235 for the green and 236 for the red. These lenses each form a raster of reduced size upon the film to be exposed with a demagnification of several times. This provides a small spot of light for scanning the film, of the order of less than 0.001" in size.

The deflection of the scanning spot is accomplished by scanning energy schematically represented as coming over conductor 237 from deflection generator "out" 6 of FIG. 1 to deflection yokes 238, 239 and 240. All yokes are identical and are composed of one pair of horizontal deflection coils for the rapid excursion of the spot at large amplitude and also of one pair of vertical deflection coils for the slow excursion of the spot at small amplitude.

In FIG. 7 only the essential mechanical and electrical elements have been shown for sake of clarity. Bearings for the shaft 230, guides for the films 224, 225, 226, supports, and optical and electrical details have been omitted, but these are known to the art.

The line structure of images reproduced by scanning, as in telephoto or television, is well known. In certain applications this aspect is tolerated or ignored. In others it is removed by overtly defocusing the reproducing spot so that each line is slightly wider than the pitch from line to line. In this latter expedient a loss of resolution results. In the electronic printing of video information a line structure is highly undesirable and a reduction of resolution cannot be tolerated. By producing as astigmatic modification in the rendition of the image in which the horizontal acuity remains at maximum but in which the vertical acuity is matched to the scanning format and the acuity of the emulsion in a manner which removes the straightness of the lines I am able to most effectively convert image information from one type of rendition to another.

It will be understood that motion picture film has its own "line" structure, which is the grain size of the silver particles. This structure is not regular, as the television line structure, but it is a definite limit beyond which practical cinematography does not go. Also, there is a known "bleeding" or spreading of response of the sensitized silver grains that is characteristic of each practical photographic emulsion. I arrange a desirable balance between the scanning line structure and the photographic limitations at the point where each contributes to the limiting condition and thus most effectively extend the limit of pleasing rendition. I provide an astigmatic control on the scanning process that may be calibrated to the known properties of specific photographic emulsions and thereby adjusted to that point where structure disappears at the least expenditure of acuity.

It will be realized that an initial astigmatism can be brought about by forming the apertures of the electron guns involved with a larger opening vertically than horizontally. The astigmatic tube is suitably rotated with respect to the vertical dimension of the film strip (224, etc.) so that the scanning spot dimension in this direction is greater in the vertical dimension. The greater dimension of the gun aperture may be nearly horizontal when magnetic focusing is employed. I prefer an asymmetric electron lens structure for producing an astigmatic spot rather than to specifically astigmatize the gun apertures. This allows modulation of the astigmatism to give an improved form of line elimination as will be brought out below.

Also, a selective "blooming" phenomenon may be employed to increase the degree of astigmatism as a direct (not inverse) function of the light intensity of the scanning spot, which behavior I prefer.

Theres is illustrated in FIG. 7 a further preferred way of accomplishing superior astigmatic performance. This involves the use of a relatively high frequency oscillator and plural multiple-controlled modulators to produce a sophisticated astigmatism.

Oscillator 240 operates at a radio frequency greater than the highest video frequency; i.e., a few times higher. It provides basic deflection energy with which the electron beam is deflected vertically at the fluorescent light-emitting screen. It may be synchronized to the image-forming processes, as by connection 241 to conductor 222, but this is not essential.

When there is but one reproducer, as 231, only one astigmatic modulator is required, likewise when the degree of astigmatism provided is not made a function of the light intensity of the scanning spot. In FIG. 7, however, the most sophisticated arrangement has been shown. This encompasses a separate astigmatic modulator for each reproducer; i.e., modulators 242, 243, 244. Each is provided with synchronizing information by connection to conductor 222, both line and field synchronization.

The resulting astigmatism is shown in FIG. 8 on an enlarged scale of two adjacent lines of an image, one odd and the other even. The rapid oscillations of oscillator 240 are shown at 246. This representation is schematic, in that the spot size is not small enough to trace out the oscillations as shown, but with these as centers the whole area of each line becomes a solid illuminated surface. The amplitude of transverse oscillation is controlled so that a definite gap 247 exists between successive lines. This is the parameter previously mentioned as adjustable according to the "spread" photographically characteristic of the particular emulsion used and is adjusted according to a calibrated control on each astigmatic modulator which determines the output amplitude thereof. These controls have not been shown in FIG. 7, but will be easily understood. Output conductors 249, 250, 251 convey such outputs to the respective deflection yokes 238, 239, 240.

It is not desirable to attempt to impress such a high frequency oscillation on the high inductance-high shunt capacitance vertical deflection windings of the yoke, although this may be done because the amplitude of deflection desired is very small and poor efficiency of such deflection can be tolerated. Alternately, a few turns of wire forming a low inductance-low shunt capacitance vertical deflection winding as a part of the deflection yoke is preferable. This winding may be resonated, if desired, to provide a low impedance utilization circuit, with only the proviso that the resonant energy not be too great to allow a relatively rapid (few microseconds) alteration of phase of the modulated energy for purposes of interleaving as now to be described.

It will be noted in FIG. 8 that each line of the reproduced image is modulated in width according to an envlope 253. The frequency of this modulation is less, of course, than that of the alternations 246 which are modulated, The modulating frequency is preferably somewhat beyond the highest video frequency that the system can actually resolve upon the film being exposed. However, the modulating frequency need not be so high and may be in the video range if desired. The objective is to render unobservable by irregularity the straight line structure characteristic of the fundamental scanning process. This is accomplished even though the irregularities might be discernable upon extremely careful inspection.

The modulating frequency is produced by modulating oscillator 255. This oscillator is controlled by a synchronizing connection to conductor 222 to shift the phase of the output therefrom by 90 electrical degrees for each line of scanning. That is, the odd lines of the image are executed at one phase and the even lines at a phase shifted 90° therefrom. Since the lines are read out sequentially for printing on the uniformly moving films 224, 225, 226, the shift in phase is required from one line to the next. This requires a rather high speed shift of phase, but it does insure that the wavy interleaving interval between lines will be rather accurately delineated in contrast to an alteration of phase once each field, where a gradual change in phase over the field due to residual causes could result in overlapping of the adjacent lines over part of the image area.

The phase modulation required may be accomplished by means of a very simple embodiment of the known reactance tube modulator. Only a small amount of modulating capability is required to produce the 90° phase shift. As an alternate, two outputs from a stable oscillator may be used, one being 90° different in phase by known phase shifting reactances and the output supplied to the astigmatic modulators switched from one modulating oscillator output to the other by means of a two position gate circuit known to the computer art.

The modulation process actually occurs in each of the astigmatic modulators 242, 243, 244. The process carried out in each is the same with respect to the modulation of the radio frequency "carrier" wave from oscillator 240 and the modulating wave from modulating oscillator 255. Separate astigmatic modulators are provided so that the modulation of the particular line raster can be controlled by the video amplitude in each of the three channels being printed out.

It is preferable to increase the astigmatic line interleaving effect as some direct power of the intensity modulation of the printing spot light intensity. This gives greatest dissipation of the line structure where it would otherwise be most brilliant and vice versa. Accordingly, each of the astigmatic modulators 242, 243, 244 is provided with a partial integrating circuit that connects to, through circuit isolation such as an isolating amplifier stage, each of the incoming video circuits; viz., blue, green and red "II." The integration constant is such that a single bright point along a line of relatively elemental duration does not cause integration to occur. However, a number of such bright points adjacently disposed does cause integration to occur and thus a uniformity of brightness over the bright areas of the image. The output of the partial integrator controls the output amplitude of the astigmatic modulator involved, as by altering the bias on a variable mu vacuum tube amplifier. In accomplishing this astigmatic line reduction effect it will be seen that the basic, or horizontal, detail of the image is not affected.

The asymmetric electron lens structure previously mentioned will also be seen to be quadrature modulatable. Accordingly, modulating oscillator 255 is merely connected to the electron lens structure and alters the astigmatic effect thereof upon the spot shape directly. I prefer an electrostatic lens associated with the electron gun structure, in which embodiment the energizing electrical energy is a voltage which incrementally changes the operating potential of one or more electrodes of the lens and thus astigmatizes the spot to the degree required. This process is carried out sufficiently rapidly to alter the fine structure of the image from the common lined appearance.

There is another important modification in the manner in which separate color-information images are recorded on motion picture film and this is the arrangement of three separate images upon one wide film, such as the presently employed 70 mm. wide film.

Such a film is shown at 260 in FIG. 9; this figure being a plan view of electronic motion picture printing apparatus for color. The wide film passes downward through the paper, being driven by sprocket 261 by means similar to those shown in greater detail in FIG. 7 in front elevation view.

The optics are defined by cones 262, 263, 264, respectively, for the blue electronic reproducer 265, green electronic reproducer 266 and the red electronic reproducer 267. A relatively wide deflection on these reproducers is reduced to a small deflection upon the film as shown.

The green light is focussed upon the film by the central lens 268 and this optical system is of the "straight through" type. The relatively large reproducers mentioned cannot be placed side by side, as in FIG. 7, thus the optical systems for the blue and the red colors are folded. This is accomplished by known reflective prisms 269 and 270, or equivalent first surface mirrors. Lenses 271 and 272 focus the blue and red images, respectively, in the same way as lens 268 focussed the green, and over the same length of optical path.

Electron beam deflection means 273, 274, 275 are supplied with synchronous deflecting energy in FIG. 9 as were deflection means 238, 239, 240 in FIG. 7. Electron guns are shown at 276, 277, 278 in FIG. 9 for originating and video modulating the intensity of the electron beams that have been referred to. Astigmatic line elimination means may also be employed as previously described.

While my method and apparatus for astigmatic line structure removal has been illustrated in connection with a color embodiment employing three separate films it is clear that it is easily employed in any of my embodiments employing film as the final recording medium. That is, the one film color or monochrome embodiment of FIG. 1. It is equally desirable that the television line structure be eliminated from black and white motion picture films as from color films.

It will also be understood that the apparatus shown in FIG. 7 can be employed for making three monochrome (black and white) film recordings at one time rather than the three color separation negatives or other color prints. This is accomplished by merely connecting all the spot intensity control electrodes to the output of one conversion channel in FIG. 1, or by arranging that all three channels have the same video signal. By altering the basic brightness control of one of the cathode-ray tubes, as 231, one recorded film can be made at reduced density so as to be suited for television motion picture transmission, while one or both of the others can be made at normal density for theatrical exhibition.

The apparatus of FIGS. 7 and 9 may also be used to record video signals representative of plural characteristics, as the polarization of the light involved in the original fiield of view or of light passed through the films printed with this apparatus.

While the examples of tape employed for video recording have been directed toward such tape with iron oxide or equivalents for forming the recorded image in a fixed magnetic pattern, my method and apparatus for conversion from one format to another are equally applicable when plastic tape is used for storing the video information by ridged deformation of one surface of such tape.

Similarly, multiple tracks lengthwise of a fast-running magnetic tape may be employed for the video signal record.

Throughout this specification specific embodiments and modes of operation have been set forth to most clearly teach my invention.

However, modifications in the size, shapes, proportions and the arrangement of mechanical and optical elements may be made to accomplish somewhat different results in accordance with my invention. Similarly, specific characteristics given to electrical elements and specific voltages or voltage ranges for typical operation have been given by way of example.

The modes of operation given illustrate a family of processes that are depicted from these examples.

Having thus fully described my invention and the manner in which it is to be practiced, I claim:

1. The electrical process for converting video information from one scanning sequence having a field period to another scanning sequence having a field period of different duration which comprises the steps of successively storing more than one sequence of said video information in a plurality of places, successively removing said video information singly from said plurality of places according to the new scanning sequence save at such times in the processing as the ratio between the durations of the field periods of the original and the new formats becomes appreciably different from unity, and at such times to combine the video signal from one said place with a corresponding part of said video signal from another said place that was later stored.

2. The method of converting a video signal having a field period from one scanning format to another which comprises the steps of successively storing said video signal in a plurality of places according to the original format thereof, successively removing said video signal from said plurality of places according to the new format save at such times in the processing as the ratio of the durations of the field periods, in the sum, between the original and the new formats, becomes sufficiently different from unity to amount to an appreciable fraction of the duration of the field period of the video signal stored in one said place, and at such a time to combine the video signal from said one place with a corresponding part of said video signal from another said place that was later stored, so that the video information according to the new format includes such information as was later stored.

3. The process of converting video information from one time sequence to another which comprises the steps of plurally storing said video information, forming a plurality of waveshapes of substantially rectangular pulses at unique recurrent intervals of time, also forming a plurality of waveshapes of substantially sawtooth pulses at other unique recurrent intervals of time, applying said substantially rectangular pulses to singly read-out said stored video information, and applying said substantially sawtooth pulses to read-out in combination plurally stored said video information to form an amplitude of combined read out video information equaling the amplitude of said single read-out of video information.

4. The process of converting video information from one scanning format to another which comprises the steps of electrically storing said video information in plural groups, forming plural irregular waveshapes of substantially rectangular pulses at uniquely phased substantially periodic intervals and also forming plural irregular waveshapes of substantially sawtooth pulses at other uniquely phased substantially periodic intervals, applying said substantially rectangular pulses of said plural irregular waveshapes to singly read-out said stored video information, and applying said substantially sawtooth pulses of said plural irregular waveshapes to read-out said stored video information in combination from plural said groups to form a sum of amplitudes of the combined read out video information that equals the amplitude of said single read-out video information.

5. The process of converting video information from one scanning format to another which comprises the steps of electrically storing said video information in separated groups, forming plural irregular waveshapes of electrical energy equal in number to the number of said groups, forming each of said plural irregular waveshapes from substantially rectangular pulses at uniquely phased substantially periodic intervals of time, and from substantially sawtooth pulses at other uniquely phased substantially periodic intervals of time, applying said substantially rectangular pulses of a said plural irregular waveshape to read-out said stored video information from one of said separated groups, and simultaneously applying said substantially sawtooth pulses of two said plural irregular waveshapes to read-out said stored video information from two said separated groups to form a sum of amplitude of read out video information equal to the amplitude of video information read out from one of said separated groups.

6. A video signal conversion apparatus comprising a source of video signals, plural video storage means to sequentially store said video signals, plural vacuum tubes connected to said plural storage means, said plural vacuum tubes each having certain common circuits, means to read said video signals out of storage, waveform means constituted to form plural different waveforms to selectively actuate said plural vacuum tubes, to normally pass said video signals as read out from only one of said storage tubes at any given time save at such times as the difference between the time sequence of said video signals as read out of said storage means with respect to the time sequence of said video signals as stored into said storage means allows discard of certain said video signals in favor of the insertion of other said video signals that originally occurred at a later time, upon said such times the conflux of said plural different waveforms from said waveform means actuates said plural vacuum tubes to pass said video signals as read out of two said storage tubes having similar video information, and means to utilize said read out video signals connected to said plural vacuum tubes, at said common circuits.

7. A video signal format conversion apparatus comprising means to reproduce video signals from a video tape record, plural video storage tubes, a write-in control to store said video signals in said storage tubes, said storage tubes interconnected by plural vacuum tubes each pair thereof having a common cathode circuit, a read-out control to read said video signals out of said storage tubes, waveform generators to form waveforms to selectively actuate the paired vacuum tubes, a combining circuit connected to said cathode circuit of each said paired vacuum tubes to selectively pass said video signals as read out from said storage tubes by said read-out control and as passed by the actuation of said paired vacuum tubes by waveforms from said waveform generators, the individual waveforms of said waveform generators related with respect to time to normally actuate only one of a pair in each said pair of vacuum tubes but at intervals to actuate both of a said pair of vacuum tubes to update the video signal of the new format, means connected to said combining circuit to record said video signals in said new format, and means to synchronize said means to record and the actuation of the recited elements with the operation of said means to reproduce said video signals.

8. A video signal format conversion apparatus comprising means to reproduce color video signals from a video tape record, at least four video storage tubes, a write-in control to store said video signals in said storage tubes corresponding to a predetermined area of scan, said storage tubes interconnected by at least two twin vacuum tubes each having a common cathode circuit, a read-out control to read said video signals out of said storage tubes, a multiple waveform generator to selectively actuate said twin vacuum tubes, a combining circuit connected to said cathode circuit of each of said twin vacuum tubes to alternately pass said video signals as read out from said storage tubes by said read-out control and as passed by the actuation of said twin vacuum tubes by said multiple waveform generator, the individual waveforms of said multiple waveform generator related one to the other with respect to time and amplitude to normally actuate only one of a twin in each said vacuum tube but at an interval determined by the difference between the intervals of time required to accomplish said predetermined areas of scan in the formats of the conversion to actuate both of a twin in a said vacuum tube to up-date the video signal of converted format, means to record said video signals in said converted format in color, said means-to-record connected to said combining circuit, additional channels of recited elements to supply video signal information required to convey color, and interconnected means to synchronize said means-to-record and the actuation of said recited elements with the operation of said means to reproduce said color video signals.

9. In a video format conversion apparatus having a source of video information according to one format, means to electrically store said information, and means to record said information according to another format, a commutating device comprising; at least one vacuum tube having two electrode structures therein with a common cathode, separate first and second electrodes in each said structure, each of said separate first electrodes of one said vacuum tube connected to one said storage means having said video information, commutating waveform-producing means to form an individual waveform for each said electrode structure, means to impress one said individual waveform upon one said second electrode, said individual waveforms related one to the other such that one said second electrode is activated at one time to cause an output of said video information to flow through said common cathode associated with said second electrode, while at certain other times said individual waveforms are related one to the other such that both associated second electrodes are partially activated to give a combination output of said video information.

10. In a video format conversion apparatus having a source of video information according to one scanning format, means to electrically store said information according to said one format, means to record said information according to another scanning format, and synchronizing means connected to operate both said means in synchronism, a commutating device comprising; two vacuum tubes each having two electron stream structures therein with a common cathode, and separate input and separate output electrodes in each said structure, each of said separate input electrodes of one said vacuum tube connected to one said storage means having similarly scanned said video information of said one format, commutating waveform-producing means to form an individual waveform for each said electron stream structure, means to impress one said individual waveform upon one said output electrode, said individual waveforms related one to the other such that one said output electrode is activated at one time to cause an output of said video information to flow in the circuit of said common cathode associated with said output electrode, while at certain other times said individual waveforms are related one to the other such that both output electrodes of one said vacuum tube are partially activated, to give a combination output of said video information having a total amplitude equal to that of said video information from one said input electrode.

11. A video format conversion apparatus comprising means to reproduce a video signal from a record, plural electrical means for individually storing video signals, write-in control means to store one field of an interlaced scan upon each said means-for-storing, electronic commutator means connected to each said means-for-storing, read-out control means connected to each said commutator-means for reading out said stored video signals alternately line for line from two said means-for-storing having in the sum a frame of video information, waveshape-forming means connected to said read-out control means to periodically actuate said commutator-means for combining outputs from two said means-for-storing containing successive like fields of interlaced scanning to advance the epoch of said video information read-out when the sum of the time intervals required to store successive said one fields differs from the sum of the time intervals required to read-out successive fields according to the new format by an amount approximating the duration of one said field time intervals, said waveshape-forming means constituted to form the sum of said outputs from said two means-for-storing as a constant amplitude with time, means to record said sequentially read out video signals; the recited elements comprising one video signal channel, at least one additional video signal channel connected between said means-to-reproduce and said means-to-record to handle in the sum video information of plural significance, and electro-optical-mechanical means to synchronize said means-to-record to said means-to-reproduce.

12. The apparatus of claim 11 in which said electro-optical-mechanical means is comprised of a film sprocket having precisely equally spaced radial lines thereon, optical-photoelectric means to sense the instantaneous position of said lines, and electrical servo means to adjust the speed of rotation of said sprocket in accordance with the rate of reproduction of said video signal from said record.

13. A video format conversion apparatus comprising means to reproduce a video signal from a record according to a given format, an even number of electrical means for individually storing video signals over an area, write-in control means to store one field of an interlaced scan upon each said means-for-storing, electronic commutator means connected to each said means-for-storing, read-out control means connected to each said commutator-means for reading out said stored video signals sequentially as to scanning from two said means-for-storing having in the sum a frame of video information, waveshape-forming means connected to said read-out control means for the actuation thereof, said waveshape-forming means constituted to periodically actuate said commutator-means to combine outputs from two said means-for-storing containing successive like fields of interlaced scanning to advance the epoch of said video information as allowed by the ratio of the frame read-out rate to the frame write-in rate, said actuation being such that the sum of outputs from said two means-for-storing is a constant amplitude with time and equal to the normal output from one of said means-for-storing, means to record said sequentially read out video signals upon motion picture film, alternate conductive means connected between said commutator-means and said means-to-record to complete the selection of video information according to the sequential mode, means to synchronize said means-to-record with said means-to-reproduce; the recited elements comprising one video signal channel, two additional video signal channels connected between said means-to-reproduce and said means-to-record to handle in the sum three-color video information.

14. A video format conversion apparatus comprising a source of video signals, plural means for storing said video signals, read-out means connected to each said means-for-storing for reading out sequentially said stored video signals as to scanning from two said means-for-storing having in the sum a frame of video information, electronic moving spot means to record said sequentially read out video signals upon motion picture film, said electronic moving spot means having an asymmetric electron lens structure to increase the dimension of said spot longitudinally of said motion picture film, electrical means connected to said electron lens to alter said increase sufficiently rapidly to alter the fine structure of the recorded image, and further electronic means to effect a quadrature change of phase in said increase of dimension from one line to the next in the image recorded by said means-to-record.

15. A video signal conversion apparatus comprising a source of video signal, plural pairs of electrical storage means, plural gates to write sequences of said video signal into a pair of said storage means, computer means to determine the sequence of said writing, alternate means to allow read-out of said video signal from only one of said pair of storage means at a time, said computer means constituted to determine which of said pair is read-out, commutating means connected to each said alternate means, gating-out means to control said commutating means according to electrically represented commands from said computer means to provide a revised video signal with an altered format, each said commutating means having video signal input elements, commutating elements, and a common output element constituted to provide said revised video signal from either one of a said pair of storage means or from a combination of one each of two said pairs of video storage means according to said control exercise upon said commutating means, said combination formed of a stored video signal and another of later stored video signal to most currently revise said video signal, and means connected to said common output element of plural said commutating means to give a single revised video signal.

16. A video signal conversion apparatus comprising means of reproduce a video signal from a record, plural pairs of video storage means, plural gates to write a field of said video signal into said pair of video storage means, computer means connected to said gates to determine the time sequence of said writing, a computer-connected switch to allow read-out of said video signal from only one of said each pairs of video storage means at one time, vacuum tube commutating means connected to each said switch, gating-out means connected to said commutating means to control the same according to electrically represented commands from said computer means to provide a revised video signal having a selected new scanning format, each of said commutating means having video signal input electrodes, commutating electrodes and a common output electrode, said commutating means constituted and controlled to provide said revised video signal from either one of a said pair of video storage means or a revised video signal from a combination of one each of two said pairs of video storage means according to control exercised upon said commutating means by said gating-out means, said combination formed of video information from a stored video signal and from another stored video signal having later video information for the purpose of up-dating said revised video signal, combining means connected to said common output electrode of plural said commutating means to give a single revised video signal; the recited elements comprising one video channel, at least one more video channel constituting said conversion apparatus for color video rendition, means to record said rendition of said revised video signal; said means to reproduce connected to said means to record to synchronize said conversion apparatus.

17. In a video format conversion equipment having a source of video signal, means to store said video signal, means to read-out said video signal from storage and means to record said video signal upon a moving motion picture film by traversing a spot of light across said film; apparatus to produce frame lines of selectable height upon said film comprising, additional means to traverse said spot of light against the motion of said motion picture film while an image is recorded thereon to thereby reduce the height of said frame line upon said film, and means coactive with said additional means to return said spot of light to its initial position with respect to the direction of motion of said film during the period while said frame line is executed.

18. The equipment and apparatus of claim 17 in which said means moves said spot of light with the direction of motion of said film to increase the height of said frame line upon said film.

19. In a video format conversion equipment having means to reproduce a video signal from a video tape record, means to store said video signal, means to read-out said video signal from storage according to another format, and cathode-ray means to record said video signal upon a uniformly moving motion picture film by traversing a spot of light from said cathode-ray means across said film; apparatus to produce frame lines of selectable height upon said film comprising, additional means to traverse said spot of light against the motion of said motion picture film as a linear function of time an amplitude corresponding to a fraction of the height of the image recorded upon said film while said image is recorded, to reduce the height of said frame line upon said film in relation to its height as a ratio between read-out time of said video signal and the vertical travel of said film during said read-out time, and means to return said spot of light to its initial position with respect to the direction of motion of said film during the period occupied by the motion of said film while said frame line of reduced height is executed.

20. The equipment and apparatus of claim 19 in which said means moves said spot of light with said direction of motion of said film to produce a frame line upon said film when the read-out time of said video signal is greater than the vertical travel of said film during said read-out time.

21. The method of removing the lined television image characteristic from such an image recorded upon motion picture film which comprises the steps of forming a modulated envelope having a modulation frequency of the order of the highest video frequency forming said television image, enlarging the element recording said image in a direction perpendicular to the motion of said element with a given modulated phase along a given television image line, similarly enlarging said element along the next television image line but with said modulated phase of said modulated envelope in approximate quadrature with the phase of said modulated envelope upon said given television image line, and repeating said approximate quadrature relation between each pair of said television image lines throughout said image.

22. The method of removing the lined characteristic of a television image from such an image recorded by a moving luminous spot upon motion picture film which comprises the steps of forming a modulated envelope having a modulation frequency higher than the highest video frequency forming said image, deflecting said luminous spot in a direction perpendicular to the image-forming motion thereof with a given modulated envelope phase along a given line, similarly deflecting said spot along the next line but with the modulated envelope phase in quadrature with respect to the phase of said modulated envelope upon said given line, increasing the amplitude of modulation of said modulated envelope in proportion to the brightness of said luminous spot, adjusting the maximum amplitude of the modulation of said envelope to nearly fill the image space between adjacent lines, and repeating the quadrature relation between each pair of said lines throughout said image.

23. In a video format conversion apparatus having a source of video signal, plural means to store said video signal, programmable means to read said video signal out of storage, means to record the image defined by said video signal upon a strip of film, means to move said film longitudinally, means to transversely scan said film with a spot of radiant flux, and means to modulate the intensity of said spot in accordance with said video signal to form said image, an astigmatic entity comprising; means to form an envelope of alternating electrical energy having amplitude modulation undulations of frequency of the order of the maximum frequency of said video signal, means to enlarge said spot of radiant flux in a direction parallel to the direction of motion of said strip of film connected for actuation to said means-to-form-an-envelope, and means to alter the phase of said modulation undulations in successive transverse scans to mask the line structure upon said film due to the scanning of said spot.

24. In a video format conversion equipment having a source of video signal, plural means to store said video signal, and programmable means to read said video signal out of storage, apparatus to record the image defined by said video signal upon a film comprising; means to move said film longitudinally, means to transversely scan said film with an exposing spot, means to modulate the intensity of said spot in accordance with said video signal to form said image, means to form alternating electrical energy having a frequency of the order of the maximum frequency of said video signal, means to amplitude modulate said alternating electrical energy connected to said means to form, means to enlarge said exposing spot in a direction parallel to the direction of motion of said film, said means to enlarge connected to said means to modulate, and means also connected to said means to modulate to change the phase of said amplitude modulation by one-fourth cycle in successive transverse scans to render indistinguishable the line structure upon said film.

25. In a video format conversion equipment having a source of video signal, plural means to electrically store said video signal, and programmable means to read said video signal out of storage according to a format other than the original format, apparatus to record the image defined by said video signal upon a film strip comprising; means to move said film strip longitudinally, means to transversely scan said strip with a spot of radiant flux, means to modulate the radiant intensity of said spot in accordance with said video signal to form said image, a first oscillator having an alternating electrical energy output several times the maximum frequency of said video signal, a second oscillator having an output of a frequency less than said maximum video frequency, a modulator connected to both said oscillators to amplitude modulate the output of said first oscillator by the output of said second oscillator, means to adjust the degree of said amplitude modulation, means connected to said modulator to deflect said spot of radiant flux in a direction parallel to the length of said strip, and means connected to said modulator to alter the phase of the output modulation therefrom by ninety electrical degrees in successive transverse scans of said spot of radiant flux to render indistinguishable the line structure due to transverse scanning upon said film strip.

26. In a video format conversion equipment having means to reproduce a video signal from a video record, means to store said video singal, and means to read said video signal out of storage, apparatus to simultaneously record said video signal on plural separate motion picture films comprising; mechanically unified means to drive said plural films, means to synchronize said drive to said means-to-reproduce said video signal connected to both said unified means and to said means-to-reproduce, means to form a spot of radiant flux aligned with each said film, means to synchronously deflect each said spot transversely of said film, means to modulate the intensity of each said spot according to said video signal connected to said means-to-reproduce, optical means for imaging one spot upon one said film for each of said plural films, and further means to deflect said spot in a direction parallel to the motion of said film for each of said plural films synchronized to said means-to-reproduce to alter the height of frame lines formed upon said film according to a selected adjustment.

27. In a video scanning format conversion equipment having a source of color video signal, means to store said video signal and means to read said video signal out of storage, apparatus to record components of said color video signal individually upon plural motion picture films comprising; mechanical means to synchronously drive said plural films, means to form and to synchronously deflect a spot of radiant flux adjacent to and transversely of each said film, means connected to said source to modulate the intensity of each said spot according to a unique component of said color video signal, plural means to image one said spot upon only one said film, further means to deflect each said spot in a direction other than the direction of deflection of prior said means to deflect, an astigmatic modulator connected to each said further means to alter the line structure produced by said deflected spot, and oscillatory means connected to each said astigmatic modulator to produce minor deflections of said spot interlocked as to amplitude of said minor deflections between succeeding transverse lines.

28. In scanning format conversion equipment having means to reproduce a color video signal from a video tape record, means to electrically store said video signal, and means to read said video signal out of storage according to another format, apparatus to record said color video signal upon three color separation motion picture films according to the visual characteristics of an all-photographic motion picture process comprising; mechanically unified means to longitudinally move said three films, means to synchronize said unified means to said means-to-reproduce connected to both said unified means and to said means-to-reproduce, one cathode-ray means aligned with each said film, means to form and to synchronously deflect a spot of radiant flux across each said cathode-ray means, means connected to said means-to-reproduce to modulate the intensity of each said spot according to one component of said color video signal, three optical means for imaging one said spot upon one said film, further means to deflect each said spot in a direction parallel to the motion of said films to selectively alter the height of the frame lines formed upon each said film, an astigmatic modulator also connected to each said further means to render indistinguishable the line structure produced by said deflected spot, and an oscillator and a modulating oscillator connected to each said astigmatic modulator to energize the same.

29. In a video format conversion equipment having a source of video signal of plural characteristics, means to store said video signal and means to read said video signal out of storage, apparatus to individually record said video signal in images of said plural characteristics upon a single motion picture film comprising; means to longitudinally uniformly move said film, plural means disposed upon one side of said motion picture film each having a deflectable spot of exposing illumination, means to synchronously deflect each said spot with respect to said film, optical means to align said illumination for impingement upon the surface of said motion picture film, means to focus each said exposing illumination to a small spot at a different area upon said film, and means connected to said source to modulate the illumination of each said spot according to a characteristic of said video signal for the formation of plural adjacent images each of a said plural characteristic upon said motion picture film.

30. In a video format conversion equipment having means to reproduce a color video signal from a video tape record, means to electrically store said video signal, and means to read said video signal out of storage according to another format, apparatus to record said video signal in three color component images upon a single wide motion picture film comprising; means to uniformly move said film in a direction along its length, means to synchronize said means-to-move to said means-to-reproduce, three adjacent means oriented successively apart by a right angle on the sensitized side of said motion picture film each having a deflectable spot of exposing radiation, means to synchronously deflect each said spot transversely of the motion of said film, optical means for altering the direction of radiation from two of said means having a deflectable spot through a right angle to align all said radiation in a direction substantially perpendicular to the surface of said motion picture film, three lens means to focus said exposing radiation to a small spot at three areas upon said film, means to modulate the intensity of said radiation of each said spot according to one color component of said color video signal and means to alter the dimension of each said spot in the direction of motion of said film for the formation of three adjacent color component images upon said motion picture film devoid of the spurious structure of the transverse deflection of said spot.

References Cited in the file of this patent

UNITED STATES PATENTS 2,816,157 Andreas et al. ---------- Dec. 10, 1957